(12) United States Patent
Hara et al.

(10) Patent No.: US 9,302,669 B2
(45) Date of Patent: Apr. 5, 2016

(54) CONTROL DEVICE FOR HYBRID VEHICLE

(71) Applicant: HONDA MOTOR CO., LTD., Tokyo (JP)

(72) Inventors: Takeshi Hara, Wako (JP); Terukazu Torikai, Wako (JP); Eri Itou, Wako (JP); Yuusuke Obata, Wako (JP); Kazuki Takahashi, Wako (JP); Seiji Takaya, Wako (JP); Satoshi Uchino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/399,731

(22) PCT Filed: May 9, 2013

(86) PCT No.: PCT/JP2013/063092
§ 371 (c)(1),
(2) Date: Nov. 7, 2014

(87) PCT Pub. No.: WO2013/168779
PCT Pub. Date: Nov. 14, 2013

(65) Prior Publication Data
US 2015/0142234 A1     May 21, 2015

(30) Foreign Application Priority Data

May 10, 2012   (JP) .................................. 2012-108438

(51) Int. Cl.
*B60W 20/00*  (2006.01)
*B60W 50/08*  (2012.01)
(Continued)

(52) U.S. Cl.
CPC ................. *B60W 20/10* (2013.01); *B60K 6/48* (2013.01); *B60K 6/52* (2013.01); *B60L 11/14* (2013.01);
(Continued)

(58) Field of Classification Search
None
See application file for complete search history.

(56) References Cited

U.S. PATENT DOCUMENTS 5,620,393 A * 4/1997 Minowa et al. ............... 477/155
5,841,201 A * 11/1998 Tabata et al. ................ 290/40 C
(Continued)

FOREIGN PATENT DOCUMENTS

DE   10 2010 007 632 A1   8/2011
EP        1 072 460 A2    1/2001
(Continued)

OTHER PUBLICATIONS

International Search Report dated Jun. 3, 2013 issued in corresponding application No. PCT/JP2013/063092.
(Continued)

*Primary Examiner* — Fadey Jabr
*Assistant Examiner* — Krishnan Ramesh
(74) *Attorney, Agent, or Firm* — Westerman, Hattori, Daniels & Adrian, LLP

(57) ABSTRACT

Provided is a control device for a hybrid vehicle, which makes it possible to manually select a degree of acceleration in tune with user's preferences and user's intended running quality. Provided is a control device for a hybrid vehicle 1 including an engine and a motor for assisting the engine with power, in which an ECU 20 is provided with a first changing unit, which prepares to increase the assist amount of the motor 12 in response to a user depressing a Plus Sport mode switch 30, and subsequently increases the assist amount of the motor 12 in response to the user pressing an accelerator pedal to cause a variation $\Delta AP$ in an accelerator position to be at least a predetermined value.

6 Claims, 12 Drawing Sheets

(51) Int. Cl.
*B60W 10/06* (2006.01)
*B60W 10/08* (2006.01)
*B60W 10/12* (2012.01)
*B60K 6/48* (2007.10)
*B60K 6/52* (2007.10)
*B60L 11/14* (2006.01)
*B60L 15/20* (2006.01)
*F02D 29/02* (2006.01)
*F02D 41/10* (2006.01)
*F02D 11/10* (2006.01)
*B60W 30/02* (2012.01)

(52) U.S. Cl.
CPC ............ *B60L 15/20* (2013.01); *B60W 10/06* (2013.01); *B60W 10/08* (2013.01); *B60W 10/12* (2013.01); *B60W 20/00* (2013.01); *B60W 30/02* (2013.01); *B60W 50/082* (2013.01); *F02D 11/105* (2013.01); *F02D 29/02* (2013.01); *F02D 41/10* (2013.01); *B60K 2006/4808* (2013.01); *B60W 2510/0638* (2013.01); *B60W 2510/081* (2013.01); *B60W 2540/04* (2013.01); *B60W 2540/10* (2013.01); *F02D 2200/602* (2013.01); *F02D 2200/604* (2013.01); *F02D 2200/606* (2013.01); *Y02T 10/626* (2013.01); *Y02T 10/6221* (2013.01); *Y02T 10/6265* (2013.01); *Y02T 10/6286* (2013.01); *Y02T 10/70* (2013.01); *Y02T 10/7077* (2013.01); *Y02T 10/7275* (2013.01); *Y10S 903/93* (2013.01)

(56) References Cited

U.S. PATENT DOCUMENTS

| | | | |
|---|---|---|---|
| 6,550,557 B2 * | 4/2003 | Wakashiro et al. | 180/65.26 |
| 8,200,408 B2 * | 6/2012 | Turski et al. | 701/87 |
| 8,727,051 B2 * | 5/2014 | Schmid et al. | 180/65.31 |
| 8,935,028 B2 * | 1/2015 | Bissontz | 701/22 |
| 2001/0004029 A1 * | 6/2001 | Wakashiro et al. | 180/170 |
| 2009/0291801 A1 * | 11/2009 | Matsubara et al. | 477/5 |
| 2010/0161194 A1 * | 6/2010 | Turski et al. | 701/87 |
| 2011/0192666 A1 * | 8/2011 | Schmid et al. | 180/165 |
| 2012/0323428 A1 * | 12/2012 | Bissontz | 701/22 |

FOREIGN PATENT DOCUMENTS

| | | |
|---|---|---|
| JP | 6-48190 A | 2/1994 |
| JP | 09-284911 A | 10/1997 |
| JP | 11-262105 A | 9/1999 |
| JP | 3097559 B2 | 10/2000 |
| JP | 2001-177910 A | 6/2001 |
| JP | 2010-120519 A | 6/2010 |

OTHER PUBLICATIONS

Extended European Search Report dated Sep. 24, 2015, issued in counterpart Application No. 13788533.1 (4 pages).

Japanese Office Action dated Sep. 15, 2015, issued in counterpart Japanese Patent Application No. 2014-514751 with a partial English translation. (3 pages).

* cited by examiner

CONTROL DEVICE FOR HYBRID VEHICLE

TECHNICAL FIELD

The present invention relates to a control device for a hybrid vehicle.

BACKGROUND ART

Patent Document 1 discloses a control device for a hybrid vehicle, which includes an engine as a power source, and an electric motor for performing torque assist while driving. The hybrid vehicle is provided with a pattern selecting switch for switching a transmission condition (a transmission map, etc.) of an automatic transmission to a power pattern or a normal pattern. When a user selects the power pattern by using the pattern selecting switch, the control device assumes that the power performance required by the user is higher than usual. At this time, the control device changes the transmission map indicating the transmission condition of the automatic transmission to the power pattern, and performs assist-control for increasing an assist amount of torque by the electric motor.

Patent Document 1: Japanese Patent No. 3097559

DISCLOSURE OF THE INVENTION

Problems to be Solved by the Invention

However, with the control device disclosed in Patent Document 1, when the power pattern is selected, the transmission condition of the automatic transmission is changed to the power pattern, and the assist torque amount of the electric motor is increased; therefore, the driving force in relation to a constant accelerator control input significantly differs before and after selecting the power pattern. In this manner, the rapid change in the driving force in relation to the constant accelerator control input is not desirable, since it is not possible to achieve a degree of acceleration in tune with user's preferences and user's intended running quality.

The present invention has been made in view of the above problem, and an object of the present invention is to provide a control device for a hybrid vehicle, which makes it possible to manually select a degree of acceleration in tune with user's preferences and user's intended running quality.

Means for Solving the Problems

In order to achieve the above-mentioned object, the present invention provides a control device for a hybrid vehicle (for example, a hybrid vehicle 1 to be described later), which is provided with an internal combustion engine (for example, an engine 11 to be described later) and an electric motor (for example, a motor 12 to be described later) for assisting the internal combustion engine with power. The control device for the hybrid vehicle according to the present invention is characterized by including a first changing unit (for example, an ECU 20 to be described later), which prepares to change an assist amount of the electric motor in response to a first input from a user (for example, the user depressing a Plus Sport mode switch 30, as described later), and subsequently changes the assist amount of the electric motor in response to a second input from the user (for example, a variation ΔAP of an accelerator position exceeding a predetermined value in response to the user pressing an accelerator pedal, as described later).

The present invention is provided with the first changing unit, which prepares to change the assist amount of the electric motor in response to the first input from the user, and subsequently changes the assist amount of the electric motor in response to the second input from the user. As a result, the assist amount is increased only in response to the second input from the user; therefore, the behavior change in the hybrid vehicle can be suppressed, and the safety can be improved. Therefore, according to the present invention, for example, it is possible to manually select a degree of acceleration in tune with user's preferences and user's intended running quality, by preparing to increase the assist amount of the electric motor in response to the first input from the user, and by subsequently increasing the assist amount of the electric motor in response to the second input from the user.

In this case, it is preferable that the first changing unit cancels the second input when a predetermined time has elapsed after receiving the first input.

In the present invention, the second input from the user is cancelled when a predetermined time (for example, a standby time to be described later) has elapsed after receiving the first input from the user. As a result, even if the first input is received from the user, the second input from the user is cancelled when a predetermined time has elapsed; therefore, the load on the control device can be reduced, and other control processing can be comfortably performed. According to the present invention, if the first input from the user is an erroneous operation, it is possible to avoid any vehicle behavior, which is not intended by the user, caused by the erroneous operation.

In this case, it is preferable to further provide: a second changing unit (for example, an ECU 20C to be described later), which prepares to change output power of the internal combustion engine in response to the first input from the user, and subsequently changes the output power of the internal combustion engine in response to the second input from the user; and a first selecting unit (for example, the ECU 20C to be described later), which selects the first changing unit or the second changing unit, based on a number of revolutions of the internal combustion engine or a number of revolutions of the electric motor.

In addition to the first changing unit, the present invention is provided with a second changing unit, which prepares to change output power of the internal combustion engine in response to the first input from the user, and subsequently changes the output power of the internal combustion engine in response to the second input from the user. In the present invention, change in the assist amount of the electric motor by the first changing unit, or change in the output power of the internal combustion engine by the second changing unit, is selected based on the number of revolutions of the internal combustion engine or the number of revolutions of the electric motor. According to the present invention, the first changing unit for changing the assist amount of the electric motor, and the second changing unit for changing the output power of the internal combustion engine are provided; and as a result, even if the remaining SOC (state of charge) level of the battery provided to the hybrid vehicle is low, the output power of the hybrid vehicle can be increased by increasing the output power of the internal combustion engine. Further, for example, when the output power is constant, the torque becomes greater as the number of revolutions becomes smaller; however, according to the present invention, change in the assist amount of the electric motor and change in the output power of the internal combustion engine are selected based on the number of revolutions; therefore, the output power can be changed based on more accurate torque.

In this case, it is preferable that the first selecting unit selects the second changing unit when the number of revolutions of the internal combustion engine or the number of revolutions of the electric motor is at least a predetermined number of revolutions; and it is preferable that the first selecting unit selects the first changing unit when the number of revolutions of the internal combustion engine or the number of revolutions of the electric motor is below the predetermined number of revolutions.

In the present invention, the output power of the internal combustion engine is changed when the number of revolutions of the internal combustion engine or the number of revolutions of the electric motor is at least a predetermined number of revolutions; and the assist amount of the electric motor is changed when the number of revolutions of the internal combustion engine or the number of revolutions of the electric motor is below the predetermined number of revolutions. For example, if the assist amount of the electric motor increased when the number of revolutions of the internal combustion engine or the number of revolutions of the electric motor is at least a predetermined number of revolutions, the electric power consumption would be increased to accelerate deterioration of the battery; however, according to the present invention, the output power of the hybrid vehicle is increased by increasing the output power of the internal combustion engine when the number of revolutions of the internal combustion engine or the number of revolutions of the electric motor is at least a predetermined number of revolutions, thereby making it possible to suppress the deterioration of the battery.

In this case, it is preferable to further provide: a second changing unit (for example, an ECU 20B to be described later), which prepares to change output power of the internal combustion engine in response to the first input from the user, and subsequently changes the output power of the internal combustion engine in response to the second input from the user; and a second selecting unit (for example, the ECU 20B to be described later), which selects the first changing unit or the second changing unit, based on a vehicle speed of the hybrid vehicle (for example, a hybrid vehicle 1B to be described later).

In addition to the first changing unit, the present invention is provided with a second changing unit, which prepares to change output power of the internal combustion engine in response to the first input from the user, and subsequently changes the output power of the internal combustion engine in response to the second input from the user. In the present invention, change in the assist amount of the electric motor by the first changing unit, or change in the output power of the internal combustion engine by the second changing unit, is selected based on a vehicle speed of the hybrid vehicle. According to the present invention, the first changing unit for changing the assist amount of the electric motor, and the second changing unit for changing the output power of the internal combustion engine are provided; and as a result, even if the remaining SOC (state of charge) level of the battery provided to the hybrid vehicle is low, the output power of the hybrid vehicle can be increased by increasing the output power of the internal combustion engine.

In this case, it is preferable that the second selecting unit selects the second changing unit when the vehicle speed is at least a predetermined vehicle speed; and it is preferable that the second selecting unit selects the first changing unit when the vehicle speed is below the predetermined vehicle speed.

In the present invention, when the vehicle speed of the hybrid vehicle is at least a predetermined vehicle speed, i.e. a high speed, the output power of the internal combustion engine is changed; and when the vehicle speed of the hybrid vehicle is below the predetermined vehicle speed, i.e. a low speed, the assist amount of the electric motor is changed. For example, if the assist amount of the electric motor is increased when the speed is high, the electric power consumption would be increased to accelerate deterioration of the battery; however, according to the present invention, the output power of the hybrid vehicle is increased by increasing the output power of the internal combustion engine when the speed is high, thereby making it possible to suppress the deterioration of the battery.

In this case, it is preferable that the second changing unit increases the output power of the internal combustion engine by increasing an amount of fuel supply and intake air mass of the internal combustion engine.

In the present invention, the output power of the internal combustion engine is increased by increasing the amount of fuel supply and the intake air mass of the internal combustion engine. This eventually facilitates entry into a kick-down state, making it possible to increase the output power of the internal combustion engine, without separately providing a transmission map of different transmission conditions. Therefore, according to the present invention, the memory of the control device can be reduced in size, and the cost can be reduced.

Effects of the Invention

According to the present invention, it is possible to provide a control device for a hybrid vehicle, which makes it possible to manually select a degree of acceleration in tune with user's preferences and user's intended running quality.

Figure 1:
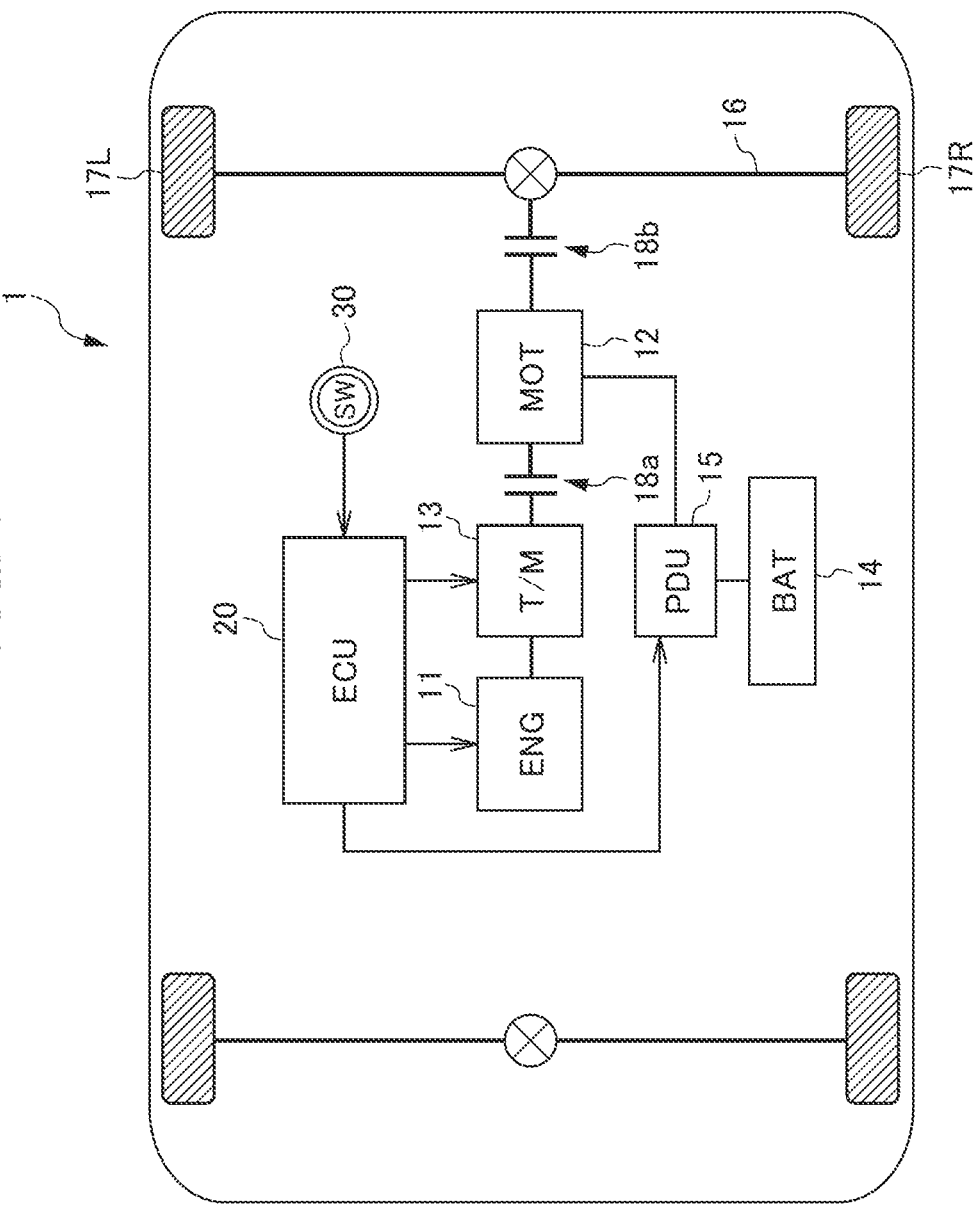
FIG. 1 is a diagram showing a configuration of a hybrid vehicle and a control device therefor according to a first embodiment.

EXPLANATION OF REFERENCE NUMERALS 1, 1A ... hybrid vehicle
11 ... engine (internal combustion engine)
12 ... motor (electric motor)
13 ... transmission
14 ... battery
15 ... PDU
20, 20A ... ECU (first changing unit, second changing unit, first selecting unit, second selecting unit)
30 ... Plus Sport mode switch

PREFERRED MODE FOR CARRYING OUT THE INVENTION

Preferred embodiments of the present invention will hereinafter be described with reference to the attached drawings. In descriptions of a second embodiment, identical reference numerals are assigned to features common to features in a first embodiment, and descriptions thereof are omitted.

First Embodiment

FIG. 1 is a diagram showing a configuration of a hybrid vehicle and a control device therefor according to a first embodiment of the present invention. The hybrid vehicle according to the first embodiment runs on torque generated by an internal combustion engine and/or torque generated by a motor.

As shown in FIG. 1, a hybrid vehicle 1 and a control device therefor are provided with: an internal combustion engine (hereinafter referred to as "engine (ENG)") 11; a motor (MOT) 12; a transmission (T/M) 13; a battery (BAT) 14; a power drive unit (hereinafter referred to as "PDU") 15; and an electronic control unit (hereinafter referred to as "ECU") 20.

The engine 11 is, for example, an inline four-cylinder engine, and burns fuel to generate torque for driving the hybrid vehicle 1. A crank shaft of the engine 11 is connected to an output shaft of the motor 12 through the transmission 13 and a first clutch 18a. The output shaft of the motor 12 is connected to a driving shaft 16 and driving wheels 17R and 17L of the hybrid vehicle 1 through a second clutch 18b.

By connecting the first clutch 18a with the second clutch 18b, the hybrid vehicle 1 can run by driving the driving shaft 16 and the driving wheels 17R and 17L, only on the torque generated by the engine 11, or on the torque generated by the engine 11 and the torque generated by the motor 12. Also, by disconnecting the first clutch 18a, EV driving is enabled by driving the driving wheels 17R and 17L, only on the torque generated by the motor 12.

The first clutch 18a and the second clutch 18b operate under the control of the ECU 20.

The motor 12 is, for example, a three-phase AC motor, and generates torque for driving the hybrid vehicle 1 on the electric power stored in the battery 14. The motor 12 is connected to the battery 14 through the PDU 15 including an inverter, and assists the engine 11 with power. The battery 14 is composed of, for example, a plurality of lithium-ion high-voltage batteries.

A configuration of the transmission 13 includes: a torque converter having a lock-up mechanism; and an automatic transmission composed of a continuously variable transmission (hereinafter referred to as "CVT"). The transmission 13 converts the torque generated by the engine 11 into a number of revolutions and torque based on a desired transmission gear ratio, and transmits them to the driving shaft 16 and the driving wheels 17R and 17L.

The ECU 20 is provided with an input circuit and a central processing unit (hereinafter referred to as "CPU"), in which the input circuit has the functions of shaping input signal waveforms from various sensors, etc., modifying a voltage level to a predetermined level, converting an analog signal value into a digital signal value, etc. In addition, the ECU 20 is provided with: a memory circuit for storing various calculation programs, calculation results, etc. executed by the CPU; and an output circuit for outputting control signals to the engine 11, the transmission 13, the PDU 15, etc.

The ECU 20 controls the operating state of the engine 11. More specifically, the ECU 20 controls the operating state of the engine 11, by controlling a fuel injection valve 111 to control an amount of fuel supply of the engine 11, and by controlling a throttle valve 112 to control intake air mass.

The ECU 20 changes the transmission gear ratio of the CVT as the transmission 13.

The ECU 20 controls the PDU 15 to drive the motor 12 on power or regenerative power. More specifically, the ECU 20 controls the PDU 15 to convert the electric power stored in the battery 14 into three-phase AC power, and supplies the power to the motor 12, thereby driving the motor 12 on power, and causing the motor 12 to generate torque in accordance with a torque command signal. Also, the ECU 20 controls the PDU 15 to generate a regenerative braking force in accordance with a torque command signal, so as to provide regenerative power to the battery 14, based on a part of the torque generated by the engine 11, or the torque transmitted from the driving wheels 17R and 17L to the output shaft through the driving shaft 16 while the hybrid vehicle 1 is decelerating, and converts the three-phase AC power output from the motor 12 into DC power so as to charge the battery 14.

Figure 2:
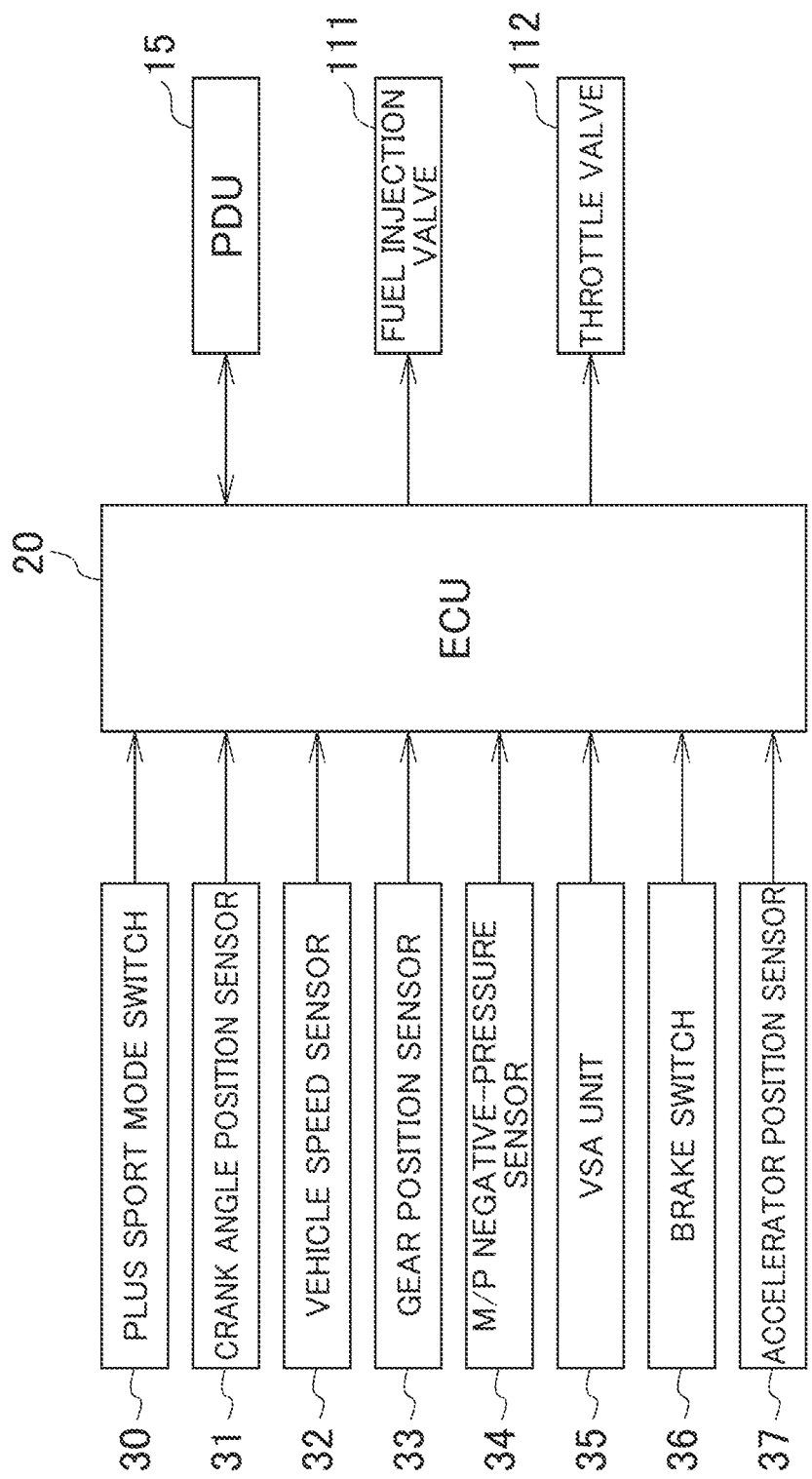
FIG. 2 is a block diagram showing the configuration of the control device for the hybrid vehicle according to the first embodiment.

FIG. 2 is a block diagram showing a configuration of the control device for the hybrid vehicle 1 according to the present embodiment.

As shown in FIG. 2, various sensors or the like such as a crank angle position sensor 31, a vehicle speed sensor 32, a gear position sensor 33, a master power (M/P) negative-pressure sensor 34, a VSA (vehicle stability assist) unit 35, a brake switch 36, and an accelerator position sensor 37 are connected to the ECU 20 through a communication line such as a CAN (controller area network). As a result, signals from these various sensors or the like are input into the ECU 20.

A Plus Sport mode switch 30 is arranged on a steering wheel, and can be operated by a user without separating a hand from the steering wheel; and a Plus Sport mode switch signal indicating a state of the switch is input into the ECU 20. A Plus Sport mode to be described later can be executed by depressing the Plus Sport mode switch 30, when the user wishes to experience a sensation of acceleration.

A signal indicating a gearshift position selected by a gearshift lever as a transmission operation unit (not shown), etc. are also input into the ECU 20.

Here, the crank angle position sensor 31 detects a number of revolutions NE of the engine 11; and the vehicle speed sensor 32 detects a vehicle speed VP in accordance with the number of revolutions of the driving wheels 17R and 17L and the driving shaft 16. The gear position sensor 33 detects a gear position of the transmission 13; and the M/P negative-pressure sensor 34 detects a master-power negative pressure of a vacuum braking booster (master power). The brake switch 36 detects an operational state of pressing a brake pedal by the user; and the accelerator position sensor 37 detects an accelerator position AP in accordance with an amount of pressing an accelerator pedal by the user. The ECU 20 calculates output torque of the engine 11, based on the accelerator position AP and the number of engine revolutions NE.

The VSA unit includes four sensors, i.e. a wheel speed sensor, a steering angle sensor, a yaw rate sensor, and a lateral acceleration sensor, which are provided to each wheel. The VSA unit controls the brake forces on the wheels, based on a wheel speed, a steering angle, a yaw rate, and lateral acceleration, which are detected by these sensors. As a result, the brake force of each wheel is individually controlled, thereby improving the obstacle avoidance performance and the vehicle behavior stability performance.

The ECU 20 including the hardware configuration as described above is further provided with a first changing unit, which is a module for executing output-power-increasing control processing to increase the output power of the hybrid vehicle 1.

In a state where a first condition (such as not currently performing a fail-safe operation) and a second condition (condition for permitting the Plus Sport mode to be executed) as described later are satisfied, when the Plus Sport mode switch 30 is depressed as a first input from the user, the first changing unit prepares to increase the assist amount of the motor 12.

In a state where the second condition is satisfied, and a third condition (condition for cancelling a Plus Sport mode standby state) as described later is not satisfied, when a variation ΔAP in the accelerator position exceeds a predetermined value, as a result of the accelerator pedal being pressed as a second input from the user, the first changing unit increases the assist amount of the motor 12. As a result, in the present embodiment, the Plus Sport mode can be executed, which makes it possible to manually select a degree of acceleration in tune with user's preferences and user's intended running quality.

While executing the Plus Sport mode to increase the assist amount, if a fourth condition (condition for terminating the execution of the Plus Sport mode) as described later is satisfied, the first changing unit terminates the assist-amount-increasing control.

In addition to the first changing unit, the ECU 20 is further provided with: a first condition determination unit for determining whether the first condition as described later is satisfied; a second condition determination unit for determining whether the second condition as described later satisfied; a third condition determination unit for determining whether the third condition as described later is satisfied; and a fourth condition determination unit for determining whether the fourth condition as described later is satisfied.

Figure 3:
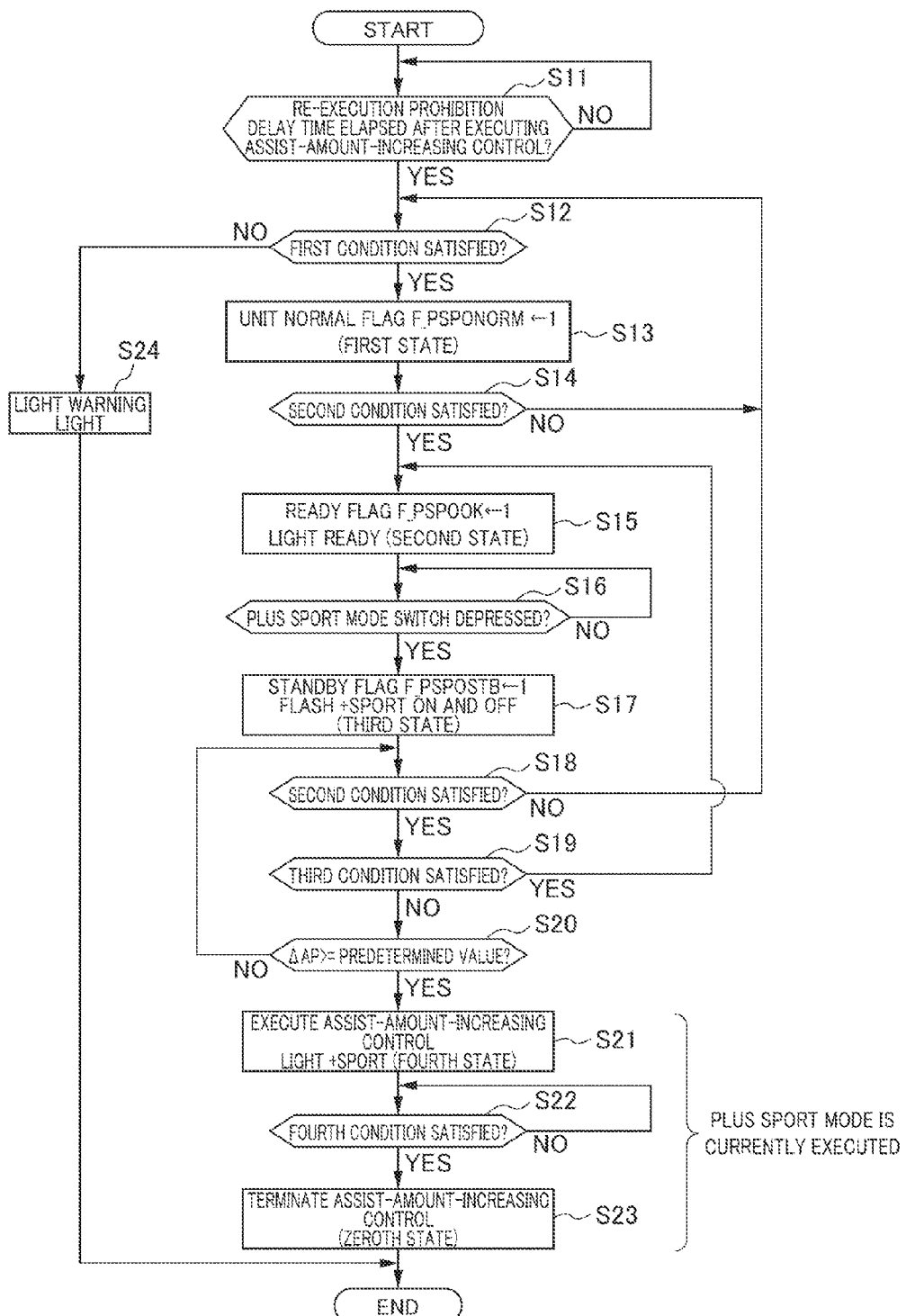
FIG. 3 is a flowchart of output-power-increasing control processing according to the first embodiment.

FIG. 3 is a flowchart of the output-power-increasing control processing according to the present embodiment. This processing is repeatedly executed by the ECU 20.

In Step S11, if the assist-amount-increasing control was executed as execution of the Plus Sport mode in Step S21 (to be described later), a determination is made on whether a re-execution prohibition delay time has elapsed. More specifically, a determination is made on whether a count value becomes "0", which is a countdown by a re-execution prohibition delay time counter that was started when terminating the execution of the assist-amount-increasing control in Step S23 (to be described later). If the determination is YES, the processing advances to Step S12; and if the determination is NO, the determination processing is repeated. This avoids consecutive execution of the assist-amount-increasing control, in terms of a remaining SOC level of the battery 14. When the user turns off the ignition switch, i.e., when the user turns off the engine 11 to stop the hybrid vehicle 1, the ECU 20 sets the count value of the re-execution prohibition delay time counter to "0".

In Step S12, a determination is made on whether the first condition is satisfied. The first condition may require that: a fail-safe operation is not currently performed because abnormality or failure is not occurring to any of the engine 11, the motor 12, the transmission (hereinafter referred to as CVT) 13, and the battery 14; abnormality or failure is not occurring to any of the above-mentioned various sensors and the VSA unit 35; etc. If the determination is YES, the processing advances to Step S13; and if the determination is NO, the processing advances to Step S24, a warning light on a meter or the like is lit, and the present processing is terminated.

In Step S13, it is determined that each unit such as the engine 11, the motor 12, the CVT 13, the battery 14, the above-mentioned various sensors, and the VSA unit 35 is in a normal state (a first state), and each unit's normal flag F_PSPONORM is set to "1". Subsequently, the processing advances to Step S14. When the first condition is no longer satisfied, each unit's normal flag F_PSPONORM is set to "0".

In Step S14, a determination is made on whether the second condition is satisfied. If the determination is YES, the processing advances to Step S15; and if the determination is NO, the processing returns to Step S12. The second condition is a condition for permitting the Plus Sport mode to be executed, and includes a battery condition, an engine/motor condition, a CVT condition, and a VSA condition. If all of these conditions are satisfied, it is determined that the second condition is satisfied.

The battery condition may require that: the remaining SOC level of the battery 14 is at least a predetermined SOC level; the output power of the battery 14 is at least predetermined acceptable output power; the temperature of the battery 14 is within a predetermined range; and the power save mode is not currently executed. If all of these conditions are satisfied, it is determined that the battery condition is satisfied.

The engine/motor condition may require that: the assist control for permitting the motor 12 to assist the engine 11 with power is currently performed; the vehicle speed is at least a predetermined vehicle speed; the brake negative pressure (M/P negative pressure) is at least a predetermined value; and it has been determined that the hybrid vehicle 1 is not currently turning. Determination of the turning of the hybrid vehicle 1 will be described later in detail. If all of these conditions are satisfied, it is determined that the engine/motor condition is satisfied.

The assist control is permitted when, for example, the fuel cutting (F/C) at a high speed is currently performed; a sleep prevention device is currently operated; or a usable zone of the battery 14 is fixed but is not a C zone that is a discharge-restricted zone to restrict discharge due to the SOC being low. In addition to the above, when a manual transmission is used as the transmission 13, the condition may require that the gearshift position is in a high gear.

The CVT condition may require that: the position of the gearshift lever as the transmission operation unit is not in a low (L) range or a reverse (R) range; the vehicle speed is at least a predetermined vehicle speed; it is determined that the clutch has been engaged, based on a slip ratio of the torque converter; it is determined that the clutch is in an in-gear state; a ratio is at most a predetermined value; it is determined that the driving wheels are not skidding when running on a road such as a low-μ (low-friction) road; and it is determined that the hybrid vehicle 1 is not spinning on ice or the like. Determination of the skidding or spinning of the driving wheels will be described later in detail. If all of these conditions are satisfied, it is determined that the CVT condition is satisfied. Similarly, when a manual transmission is used as the transmission 13, the condition may require that: the gearshift position is not in a low gear; the vehicle speed is at least a predetermined vehicle speed; it is determined that the driving wheels are not skidding when running on a road such as a low-μ (low-friction) road; and it is determined that the hybrid vehicle 1 is not spinning on ice or the like.

The VSA condition may require that the VSA unit 35 is not currently active. If the VSA unit 35 is not currently active, it is determined that the VSA condition is satisfied.

In Step S15, it is determined that the Plus Sport mode is ready to be executed (a second state), and a ready flag F_PSPOOK is set to "1". At this time, a READY indicator on a meter or the like is turned on (for example, the READY indicator is lit). Subsequently, the processing advances to Step S16. When the second condition is no longer satisfied, the ready flag F_PSPOOK is set to "0".

In Step S16, a determination is made on whether the Plus Sport mode switch 30 is depressed by the user. If the determination is YES, the processing advances to Step S17; and if the determination is NO, the determination processing is repeated.

In Step S17, it is determined that the Plus Sport mode is ready to be executed, which is a standby state (a third state), i.e. a state of waiting for a trigger; and a standby flag F_PSPOSTB is set to "1". At this time, a standby indicator on a meter or the like is turned on (for example, a +SPORT indicator flashes on and off). Subsequently, the processing advances to Step S18. When the third condition is no longer satisfied, the standby flag F_PSPOSTB is set to "0".

In Step S18, a determination is made again on whether the above-mentioned second condition (including the battery condition, the engine/motor condition, the CVT condition, and the VSA condition) is satisfied, i.e. whether the ready flag F_PSPOOK is "1". If the determination is YES, the processing advances to Step S19; and if the determination is NO, the processing returns to Step S12.

In Step S19, a determination is made on whether the third condition is satisfied. If the determination is NO, the processing advances to Step S20; and if the determination is YES, the processing returns to Step S15.

The third condition is a condition for cancelling the standby state for executing the Plus Sport mode. More specifically, the third condition may require that: a preset and predetermined standby time has elapsed since the determination of standby state was made in Step S17 (the count value of the standby time counter is "0"); the brake switch 36 is turned on by the user pressing the brake pedal; the Plus Sport mode switch 30 is depressed again by the user; and the second condition (including the battery condition, the engine/motor condition, the CVT condition, and the VSA condition) is not satisfied. If any of these conditions is satisfied, it is determined that the third condition is satisfied.

In addition to the above, when a manual transmission is used as the transmission 13, the third condition may require that the clutch is not engaged.

The hybrid vehicle 1 may be provided with a 3-mode drive system including: a SPORT mode for actively controlling the output power of the engine 11 to increase, and actively controlling the assist amount of the motor 12 to increase; a NORMAL mode for normally controlling the output power of the engine 11, and normally controlling the assist amount of the motor 12; and an ECON mode for controlling the output power of the engine 11 and the assist amount of the motor 12 by giving priority to the fuel efficiency. In such a case, the third condition may require that a mode is currently transitioning among the three modes.

In Step S20, a determination is made on whether the variation ΔAP of the accelerator position AP caused by the user pressing the accelerator pedal is at least a predetermined value. If the determination is YES, the processing advances to Step S21; and if the determination is NO, the processing returns to Step S18. When the ΔAP exceeds the predetermined value, a Plus Sport mode start flag F_PSPOTRG is set to "1". After a predetermined time has elapsed, the Plus Sport mode start flag F_PSPOTRG is set to "0".

In Step S21, since the Plus Sport mode start flag F_PSPOTRG was set to "1", the assist-amount-increasing control processing for increasing the assist amount of the motor 12 starts to be executed as execution of the Plus Sport mode, and the processing advances to Step S22. While the Plus Sport mode is currently executed, an indicator on a meter or the like indicates that the Plus Sport mode is currently executed (for example, the +SPORT indicator is lit). The state at this time is a fourth state.

In Step S22, a determination is made on whether the fourth condition is satisfied. If the determination is YES, the processing advances to Step S23; and if the determination is NO, the determination processing is repeated.

The fourth condition is a condition for terminating the execution of the Plus Sport mode. More specifically, the fourth condition may require that: the Plus Sport mode switch 30 is depressed again by the user; an operated period of the Plus Sport mode, which has been set in terms of the consumption and requirements of the battery 14 (for example, 10 seconds), has elapsed (the count value of the operation time counter is "0"); −ΔAP is currently caused by the user releasing the accelerator pedal; the above-mentioned second condition (including the battery condition, the engine/motor condition, the CVT condition, and the VSA condition) is not satisfied; and the above-mentioned third condition is satisfied (however, excluding a condition that the predetermined standby time has not elapsed, and a condition of not currently transitioning among the three modes). If any of these conditions is satisfied, it is determined that the fourth condition is satisfied.

The operating time of the Plus Sport mode may be set in advance to a predetermined operating time, or may be set on the basis of the remaining SOC level that is detected.

In Step S23, the execution of the assist-amount-increasing control processing for increasing the assist amount of the motor 12 is terminated, and it is determined that the current state is a zeroth state to terminate the present processing.

Next, a determination of the turning of the hybrid vehicle 1 is described in detail, with regard to the engine/motor condition that constitutes the second condition (the condition for permitting the Plus Sport mode to be executed), the third condition (the condition for cancelling the standby state), and the fourth condition (the condition for terminating the execution of the Plus Sport mode).

If the Plus Sport mode is executed while the hybrid vehicle 1 is turning, the hybrid vehicle 1 may deviate from the driving line. Therefore, the Plus Sport mode is permitted to be executed only in a case in which the hybrid vehicle 1 is determined to be not turning but in a stable state, by determining the steering angle.

When determining the steering angle, a determination is made on whether the steering angle of the hybrid vehicle 1 is within a preset steering-angle threshold value, based on the wheel speed, the steering angle, the yaw rate, and the lateral acceleration, which are obtained from the VSA unit including the four sensors, i.e. the wheel speed sensor, the steering angle sensor, the yaw rate sensor, and the lateral acceleration sensor, which are provided to each wheel.

Here, the steering angle obtained from the VSA unit 35 is a relative steering angle, based on the start-up steering angle as 0 degrees. Therefore, in order to obtain an actual steering angle, the ECU 20 needs to correct an actual zero point. The zero-point correction is based on the wheel speed, the yaw rate and the lateral acceleration obtained from the VSA unit 35, in which a sensor value of the relative steering angle when determining the straight-ahead driving is learned as a zero point. More specifically, when a deviation of the wheel speed of the right and left wheels is below a predetermined straight-ahead driving determination threshold value, the lateral acceleration is below a predetermined straight-ahead driving determination threshold value, the yaw rate is below a predetermined straight-ahead driving determination threshold value, and the vehicle speed is above a predetermined straight-ahead driving determination threshold value, it is determined that the hybrid vehicle is driving straight ahead without any steering angle, and the sensor value of the relative steering angle at this time is learned for a certain period of time for correction, which is then stored as a zero point. This zero-point correction is performed once, each time the user turns on the ignition switch. Execution of the Plus Sport mode is prohibited until the learning is completed, since the sensor value of the relative steering angle does not make it possible to determine whether the steering is performed.

The straight-ahead driving determination threshold value for each sensor value falls within a normal error range of each sensor, and is appropriately set in balance with the steering-angle threshold value.

If the steering angle after the zero-point correction is within the range of the preset steering-angle threshold value, the hybrid vehicle 1 is determined to be not turning, and the Plus Sport mode is permitted to be executed. If the steering angle after the zero-point correction is outside the range of the steering-angle threshold value, the hybrid vehicle 1 is determined to be turning, and execution of the Plus Sport mode is prohibited. At this time, the READY indicator and the +SPORT indicator are turned off.

A method for setting the steering-angle threshold value is described.

Figure 4:
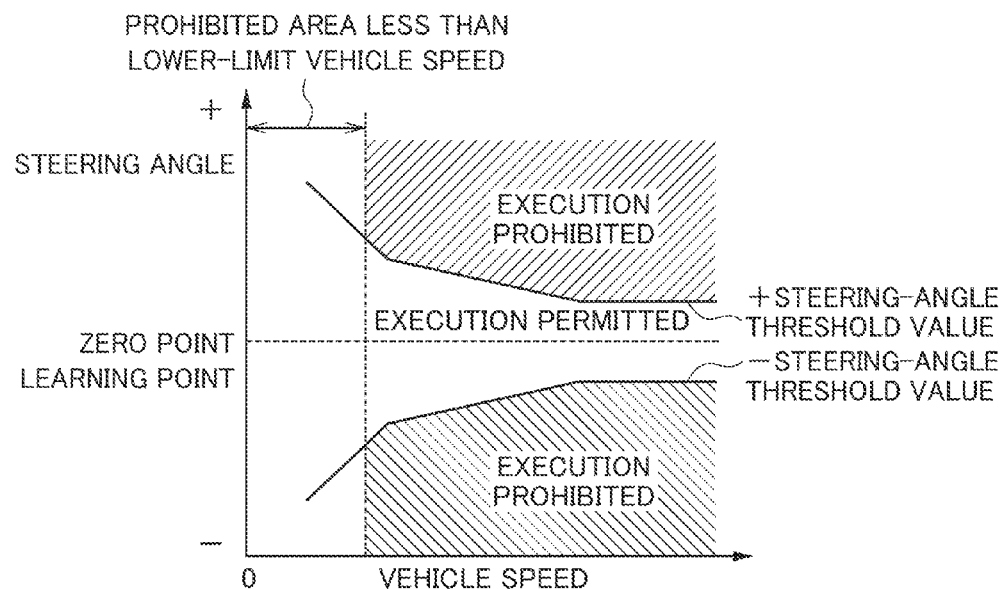
FIG. 4 is a diagram showing steering-angle threshold values, which are set in accordance with vehicle speeds.

FIG. 4 is a diagram showing the steering-angle threshold values that are set in accordance with the vehicle speeds. As shown in FIG. 4, for example, when the direction to the right is "+", and the direction to the left is "−" in relation to the zero-point learning point (zero point after correction), the steering-angle threshold values are set in both ways of "±", and are set smaller toward higher speeds. More specifically, the steering-angle threshold values are set within the range of steering-angles when changing the driving lanes, as confirmed by actual driving, so as to allow the range of steering-angles when overtaking by changing the driving lanes.

In FIG. 4, a prohibited area less than lower-limit vehicle speed is an area, in which the condition of the vehicle speed being at least a predetermined vehicle speed is not satisfied, with regard to the engine/motor condition that constitutes the second condition (the condition for permitting the Plus Sport mode to be executed), the third condition (the condition for cancelling the standby state), and the fourth condition (the condition for terminating the execution of the Plus Sport mode). Execution of the Plus Sport mode is prohibited in this area.

Next, determination of the skidding of the driving wheels is described below in detail, in relation to the third condition (condition for cancelling the standby state), and the fourth condition (condition for terminating the execution of the Plus Sport mode).

If the output-power-increasing control is executed while the hybrid vehicle 1 is running on a low-μ road (a slippery road with a low friction coefficient μ), the driving wheels are likely to skid, disabling the hybrid vehicle 1 from safely running. Therefore, the Plus Sport mode is permitted to be executed only in a case in which the hybrid vehicle 1 is determined to be not skidding but in a stable state, through determination of the skidding of the driving wheels.

Determination of the skidding of the driving wheels is made by a difference in wheel speeds of the front and rear wheels, based on the wheel speeds provided from the VSA unit 35. More specifically, if the wheel speed of the driving wheels is greater than the wheel speed of the non-driving wheels by a predetermined threshold value, it is determined that the driving wheels are skidding on a low-μ road.

More specifically, at first, a difference in front and rear wheel speeds is calculated by subtracting an average value of the rear-right and rear-left wheel speeds (or a reliable one of the rear-right and rear-left wheel speeds) from an average value of the front-right and front-left wheel speeds. Then, if the calculated difference in the front and rear wheel speeds is at least a predetermined threshold value of difference in front and rear wheel speeds, it is determined that the driving wheels are skidding. At this time, if the READY indicator is currently lit, it is left lit, and the user is not allowed to turn on the Plus Sport mode switch 30. If the +SPORT indicator is currently flashing on and off, the +SPORT indicator is turned off, and the READY indicator is lit. If the +SPORT indicator is currently lit, execution of the Plus Sport mode is suspended.

A method for setting the threshold value of difference in the front and rear wheel speeds is described.

Figure 5:
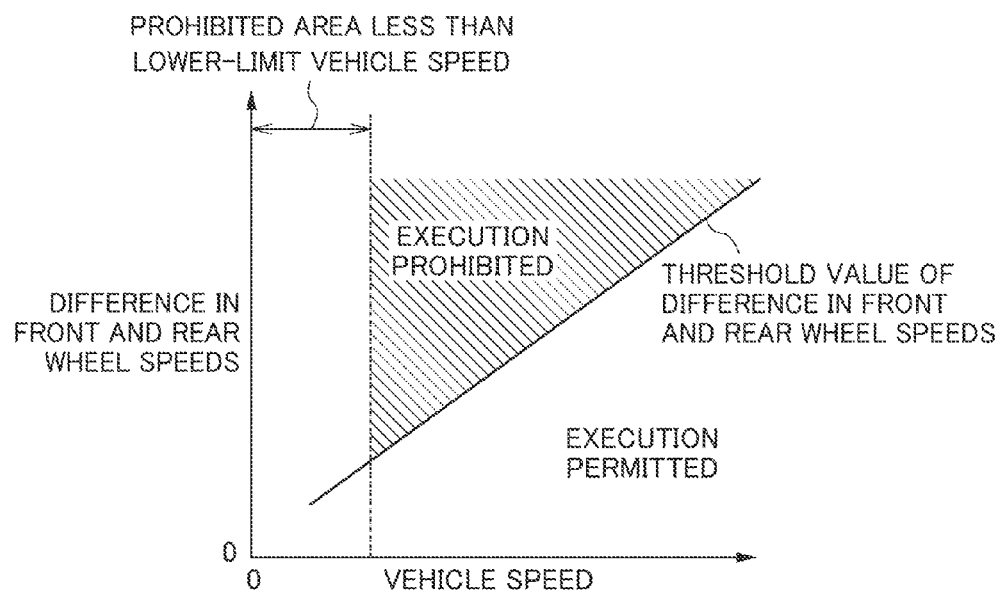
FIG. 5 is a diagram showing threshold values of difference in front and rear wheel speeds, which are set in accordance with vehicle speeds.

FIG. 5 is a diagram showing threshold values of difference in front and rear wheel speeds, which are set in accordance with vehicle speed. As shown in FIG. 5, the threshold value of difference in the front and rear wheel speeds is set larger toward higher speed. More specifically, the threshold value of difference in the front and rear wheel speeds is set to a value such that the hybrid vehicle 1 can safely run on a low-μ road, if the Plus Sport mode is executed within the range of the steering-angle threshold values. Hysteresis is set to the threshold value of difference in the front and rear wheel speeds, which is appropriately corrected in accordance with the steering-angle threshold value as described above.

A prohibited area less than the lower-limit vehicle speed in FIG. 5 is similar to the prohibited area less than the lower-limit vehicle speed in FIG. 4, and execution of the Plus Sport mode is prohibited in this area.

Next, determination of the spinning of the driving wheels is described in detail, in relation to the third condition (condition for cancelling the standby state), and the fourth condition (condition for terminating the execution of the Plus Sport mode).

If the Plus Sport mode is executed while the hybrid vehicle 1 is running on a low-μ road, the right and left wheels are likely to slip, disabling the hybrid vehicle 1 from safely running. Therefore, the Plus Sport mode is permitted to be executed only in a case in which the hybrid vehicle 1 is determined to be not slipping but in a stable state, through determination of the spinning of the driving wheels.

Determination of the spinning of the driving wheels is made by a difference in the right and left wheel speeds, based on the wheel speeds provided from the VSA unit 35. More specifically, if the difference in the right and left driving wheel speeds is at least a predetermined threshold value, it is determined that the driving wheels are spinning on ice or the like.

More specifically, at first, a difference in the right and left wheel speeds is calculated by subtracting one from the other of the right and left wheel speeds. Then, if an absolute value of the calculated difference in the right and left wheel speeds is at least a predetermined threshold value of difference in the right and left wheel speeds, it is determined that the driving wheels are spinning on ice or the like. At this time, if the READY indicator is currently lit, it is left lit, and the user is not allowed to turn on the Plus Sport mode switch 30. If the +SPORT indicator is currently flashing on and off, the +SPORT indicator is turned and the READY indicator is lit. If the +SPORT indicator is currently lit, execution of the Plus Sport mode is suspended.

The threshold value of difference in the right and left wheel speeds is set to a value such that the hybrid vehicle 1 can safely run on ice, if the Plus Sport mode is executed within the range of the steering-angle threshold values.

Figure 6:
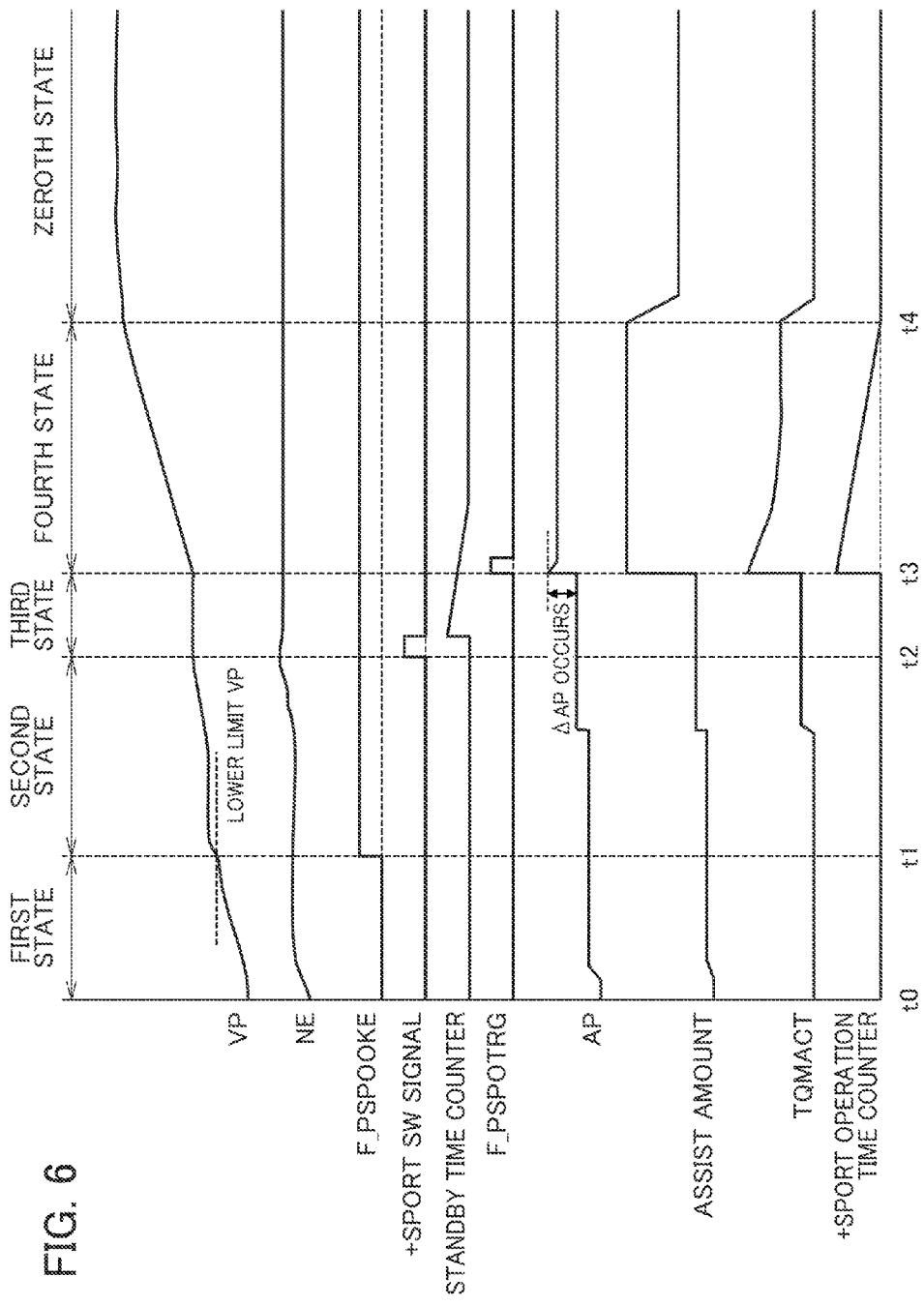
FIG. 6 is a timing diagram showing an example of assist-amount-increasing control processing according to the first embodiment (an example of terminating a Plus Sport mode, based on elapsed time counter)

FIG. 6 is a timing diagram showing an example of the assist-amount-increasing control processing according to the first embodiment (an example of terminating the Plus Sport mode, based on elapsed time counter). The present timing diagram shows chronological change in: the vehicle speed VP, the number of revolutions NE of the engine, the Plus Sport mode ready flag F_PSPOOK, a Plus Sport mode switch (+SPORT_SW) signal, a Plus Sport mode standby time counter, the Plus Sport mode start flag F_PSPOTRG, the accelerator position AP, the assist amount of the motor 12, output torque TQMACT of the hybrid vehicle 1, and a Plus Sport mode (+SPORT) operation time counter.

As shown in FIG. 6, at first, during a period of time from t0 to t1, since the vehicle speed VP is less than a predetermined lower limit vehicle speed VP, it is determined that the second condition (condition for permitting the Plus Sport mode to be executed) is not satisfied, and execution of the Plus Sport mode is prohibited. It is assumed herein that the first condition (such as not currently performing a fail-safe operation) is satisfied, and that the time t0 to t1 represents the first state.

At time t1, the vehicle speed VP reaches a predetermined lower limit vehicle speed VP, it is determined that the second condition (condition for permitting the Plus Sport mode to be executed) is satisfied (i.e. the second conditions other than the vehicle speed are also satisfied), and the Plus Sport mode ready flag F_PSPOOK is set to "1". As a result, the current state is determined to be the second state (state ready to execute the Plus Sport mode), and the READY indicator on a meter or the like is turned on (for example, the READY indicator is lit).

At time T2, the user depresses the Plus Sport mode switch 30 to turn on a Plus Sport mode switch signal. As a result, it is determined that the current state is the third state (Plus Sport mode standby state, i.e. a trigger standby state); and the standby indicator on a meter or the like is turned on (for example, the +SPORT indicator flashes on and off).

Upon determining that the current state is the third state, a countdown is started by the Plus Sport mode standby time counter, which is set in advance to a predetermined standby time.

At time t3, when the user presses the accelerator pedal, a variation ΔAP occurs in the accelerator position AP, and exceeds a predetermined value; and as a result, the Plus Sport mode start flag F_PSPOTRG is set to "1".

When the Plus Sport mode start flag F_PSPOTRG is set to "1", the Plus Sport mode is executed to increase the assist amount of the motor 12. At this time, an indicator on a meter or the like indicates that the Plus Sport mode is currently executed (for example, the +SPORT indicator is lit). As a result, the output torque TQMACT of the hybrid vehicle 1 is increased.

At this time, a countdown is started by the Plus Sport mode standby time counter, which is set in advance to a predetermined operation time, or which is set based on a remaining SOC level.

At time t4, the count value of the Plus Sport mode operation time counter becomes "0", and upon determining that the fourth condition (condition for terminating the execution of the Plus Sport mode) is satisfied, the execution of the Plus Sport mode for increasing the assist amount of the motor 12 is suspended. As a result, the output torque TQMACT of the hybrid vehicle 1 is gradually decreased. On and after the time t4, since the Plus Sport mode for increasing the assist amount has been executed, the re-execution prohibition delay time has elapsed (i.e. the count value of the re-execution prohibition delay time counter becomes "0"), and the state will be determined to be the zeroth state until the first condition satisfied.

Figure 7:
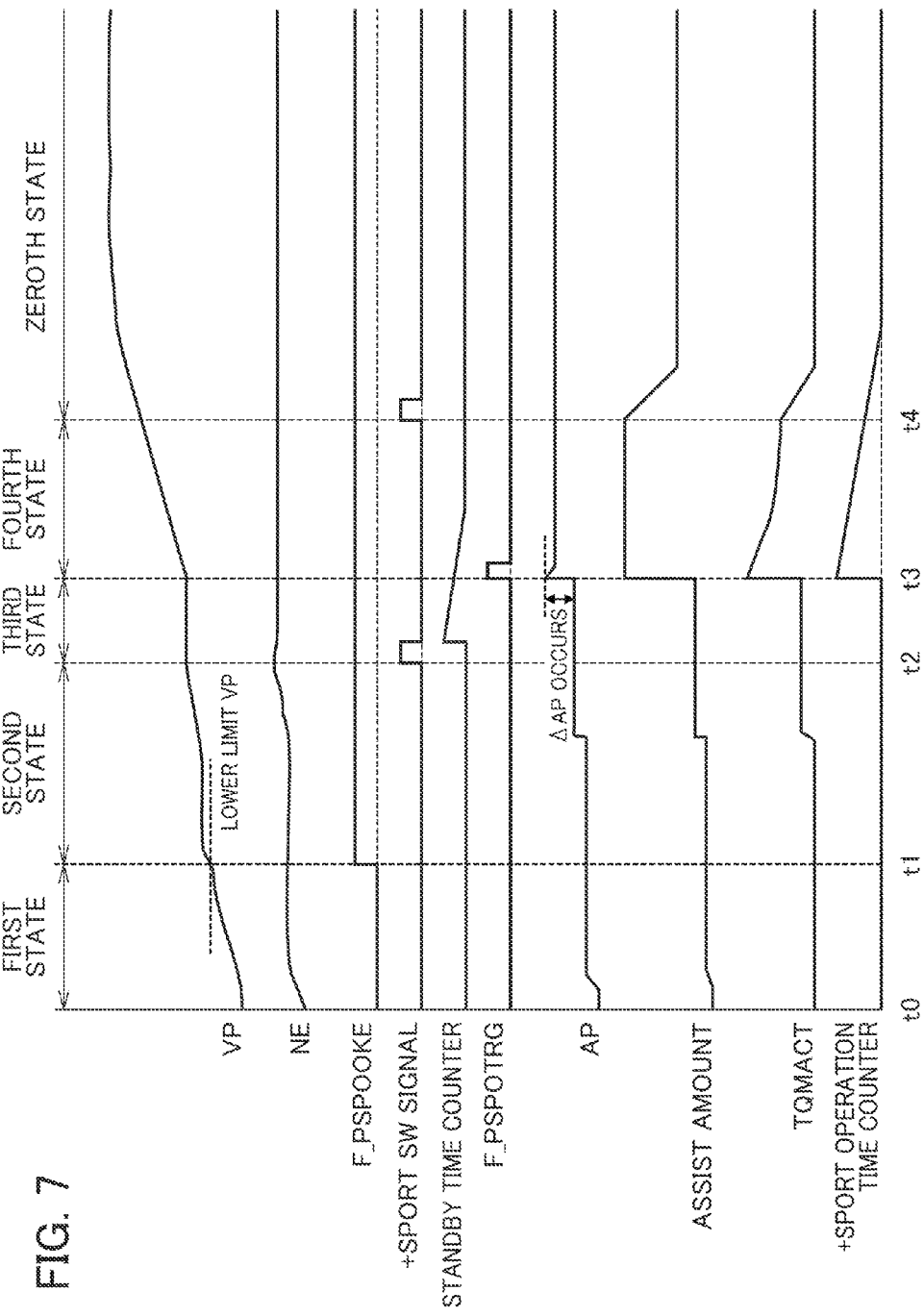
FIG. 7 is a timing diagram showing an example of the assist-amount-increasing control processing according to the first embodiment (an example of terminating the Plus Sport mode by turning on the Plus Sport mode switch again)

FIG. 7 is a timing diagram showing an example of the assist control processing according to the first embodiment (an example of terminating the Plus Sport mode by turning on the Plus Sport mode switch again). Control to be executed through time t0 to t3 shown in the timing diagram of FIG. 7 is similar to the control shown in the timing diagram of FIG. 6.

In the timing diagram shown in FIG. 7, at time t4, the user depresses the Plus Sport mode switch 30 again to turn on the Plus Sport mode switch signal again, and upon determining that the fourth condition (condition for terminating the execution of the Plus Sport mode) is satisfied, the execution of the Plus Sport mode for increasing the assist amount of the motor 12 is suspended. As a result, the output torque TQMACT of the hybrid vehicle 1 is gradually decreased. On and after the time t4, since the Plus Sport mode for increasing the assist amount has been executed, the re-execution prohibition delay time has elapsed, and the state will be determined to be the zeroth state until the first condition is satisfied. At this time, the re-execution prohibition delay time is set shorter than the time in a case of executing the Plus Sport mode, until the count value of the Plus Sport mode operation time counter becomes "0", in accordance with the remaining SOC level.

Figure 8:
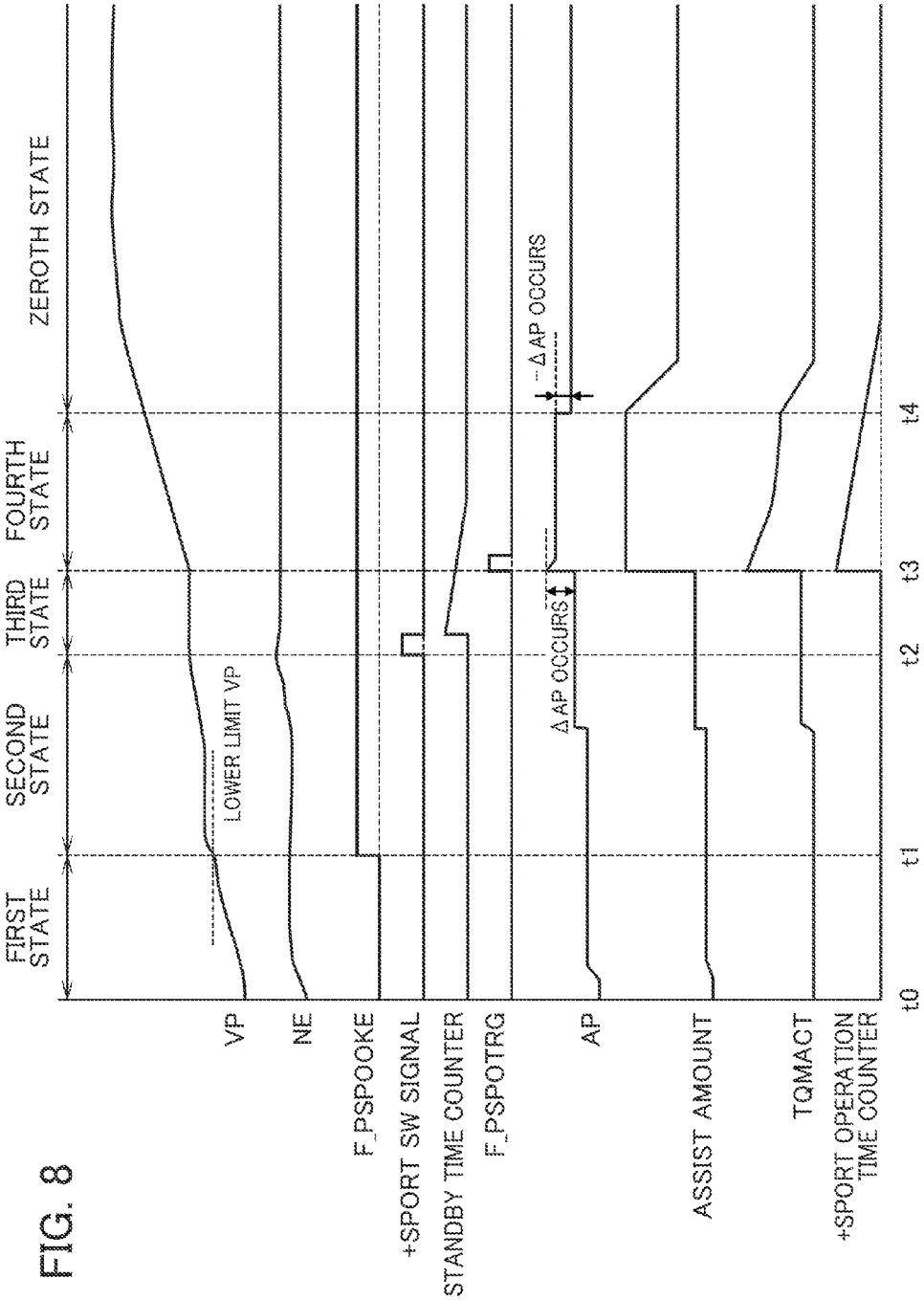
FIG. 8 is a timing diagram showing an example of assist-amount-increasing control processing according to the first embodiment (an example of terminating the Plus Sport mode, based on occurrence of $-\Delta AP$)

FIG. 8 is a timing diagram showing an example of the assist control processing according to the first embodiment (an example of terminating the Plus Sport mode, based on occurrence of −ΔAP). Control to be executed through time t0 to t3 shown in the timing diagram of FIG. 8 is similar to the control shown in the timing diagram of FIG. 6.

In the timing diagram shown in FIG. 8, at time t4, the user releases the accelerator pedal to cause −ΔP, and upon determining that the fourth condition (condition for terminating the execution of the Plus Sport mode) is satisfied, the execution of the Plus Sport mode for increasing the assist amount of the motor 12 is suspended. As a result, the output torque TQMACT of the hybrid vehicle 1 is gradually decreased. On and after the time t4, since the Plus Sport mode for increasing the assist amount has been executed, the re-execution prohibition delay time has elapsed, and the state will be determined to be the zeroth state until the first condition is satisfied. At this time, the re-execution prohibition delay time is set shorter than the time in a case of executing the Plus Sport mode until the count value of the Plus Sport mode operation time counter becomes "0", in accordance with the remaining SOC level.

According to the present embodiment, the following effects are achieved.

In the present embodiment, the ECU 20 is provided with the first changing unit, which prepares to increase the assist amount of the motor 12 in response to the first input from the user (depression of the Plus Sport mode switch 30), and subsequently increases the assist amount of the motor 12 in response to the second input from the user (ΔAP occurring by pressing the accelerator pedal). As a result, the assist amount is increased only in response to the second input from the user; therefore, the behavior change in the hybrid vehicle 1 can be suppressed, and the safety can be improved. Therefore, according to the present embodiment, it is possible to manually select a degree of acceleration in tune with user's preferences and user's intended running quality.

In the present embodiment, the second input from the user is cancelled when a predetermined standby time has elapsed after receiving the first input from the user. As a result, even if the first input is received from the user, the second input from the user is cancelled when a predetermined time has elapsed; therefore, the load on the ECU 20 can be reduced, and other control processing can be comfortably performed. According to the present embodiment, if the first input from the user is an erroneous operation, it is possible to avoid any vehicle behavior, which is not intended by the user, caused by the erroneous operation.

The present invention is not limited to the first embodiment, and the present invention includes alterations, improvements, etc. within the range that can achieve the object of the present invention.

Figure 9:
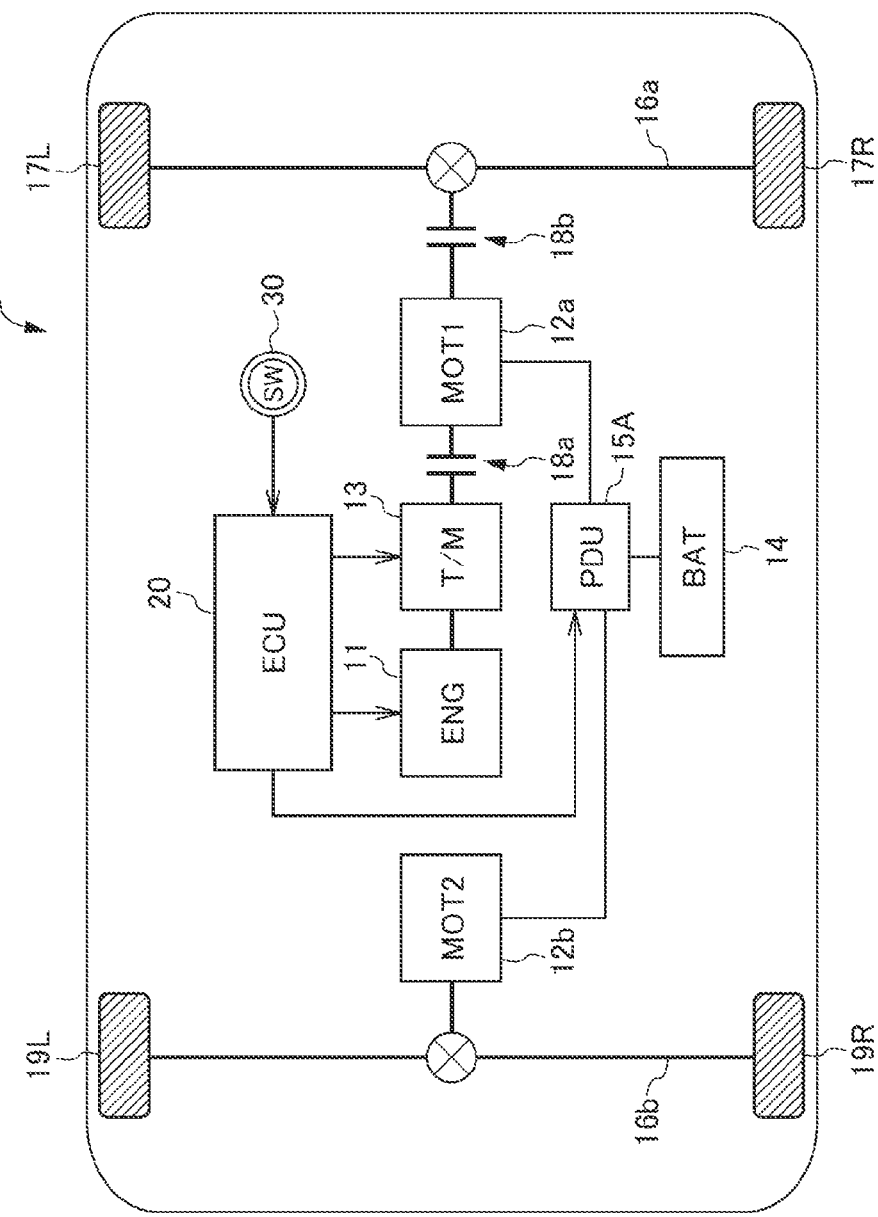
FIG. 9 is a diagram showing a configuration of a hybrid vehicle and a control device therefor according to a modification example of the first embodiment.

For example, in the first embodiment, only the motor 12 is provided as an electric motor in the front side; however, an additional motor may also be provided in the rear side. Here, FIG. 9 is a diagram showing a configuration of a hybrid vehicle 1A and a control device therefor according to a modification example of the first embodiment of the present invention. As shown in FIG. 9, in the modification example, a first motor 12a as a front motor, and a second motor 12b as a rear motor are provided. The first motor 12a and the second motor 12b are controlled by an ECU 20A through a PDU 15A. In the modification example, any one of first motor 12a and the second motor 12b assists the engine 11 with power. Selection of the first motor 12a or the second motor 12b is determined based on the state of vehicle. More specifically, a determination is made on the basis of road gradient, vehicle motion, road state (whether the road is a low-μ road), etc.

Second Embodiment

In the first embodiment described above, as the execution of the Plus Sport mode in the output-power-increasing control processing, the output power of the hybrid vehicle 1 is increased by executing the assist-amount-increasing control for increasing the assist amount of the motor 12. In contrast, in the second embodiment, output power of a hybrid vehicle 1B is increased through selection and execution of, in accordance with the vehicle speed, whether the assist amount of the motor 12 is increased, or the output power of the engine 11 is increased, which is the point of difference from the first embodiment. More specifically, in the present embodiment, the output power of the engine 11 is increased when the speed is high, and the assist amount of the motor 12 is increased when the speed is low, thereby increasing the output power of the hybrid vehicle 1B.

In other words, the second embodiment is provided with a configuration similar to the configuration of the first embodiment, except for the configuration of the ECU being different.

Similarly to the first embodiment, an ECU 20B according to the present embodiment is provided with a first changing unit, a first condition determination unit, a second condition determination unit, a third condition determination unit, and a fourth condition determination unit. The ECU 20B is further provided with a second changing unit and a selection unit, which are modules for executing output-power-increasing control processing to increase the output power of the hybrid vehicle 1B.

The configuration of the first condition determination unit, the second condition determination unit, the third condition determination unit and the fourth condition determination unit is similar to the configuration in the first embodiment.

In a state where a first condition (such as not currently performing a fail-safe operation) and a second condition (condition for permitting the Plus Sport mode to be executed) are satisfied, when the Plus Sport mode switch 30 is depressed as a first input from the user, the first changing unit prepares to increase the assist amount of the motor 12.

In a state where the second condition is satisfied, and a third condition (condition for cancelling the Plus Sport mode standby state) is not satisfied, when the variation ΔAP of the accelerator position exceeds a predetermined value in response to a second input from the user pressing the accelerator pedal, and the vehicle speed is below a predetermined vehicle speed, the first changing unit is selected by the selection unit to increase the assist amount of the motor 12.

While executing the Plus Sport mode to increase the assist amount, if a fourth condition (condition for terminating the execution of the Plus Sport mode) is satisfied, the first changing unit terminates the assist-amount-increasing control.

In a state where the first condition (such as not currently performing a fail-safe operation) and the second condition (condition for permitting the Plus Sport mode to be executed) are satisfied, when the Plus Sport mode switch 30 is depressed as the first input from the user, the second changing unit prepares to increase the output power of the engine 11.

In a state where the second condition is satisfied, and the third condition (condition for cancelling the Plus Sport mode standby state) is not satisfied, when the variation ΔAP of the accelerator position exceeds a predetermined value in response to the second input from the user pressing the accelerator pedal, and the vehicle speed is at least a predetermined vehicle speed, the first changing unit is selected by the selection unit to increase the output power of the engine 11.

While executing the Plus Sport mode to increase the assist amount, if a fourth condition (condition for terminating the execution of the Plus Sport mode) is satisfied, the first changing unit terminates the assist-amount-increasing control.

As a result, in the present embodiment, the Plus Sport mode can be executed, which makes it possible to manually select a degree of acceleration in tune with user's preferences and user's intended running quality.

In order to increase the output power of the engine 11, the second changing unit controls a fuel injection valve 111 to increase the amount of fuel supply, or controls a throttle valve 112 to increase intake air mass.

Figure 10:
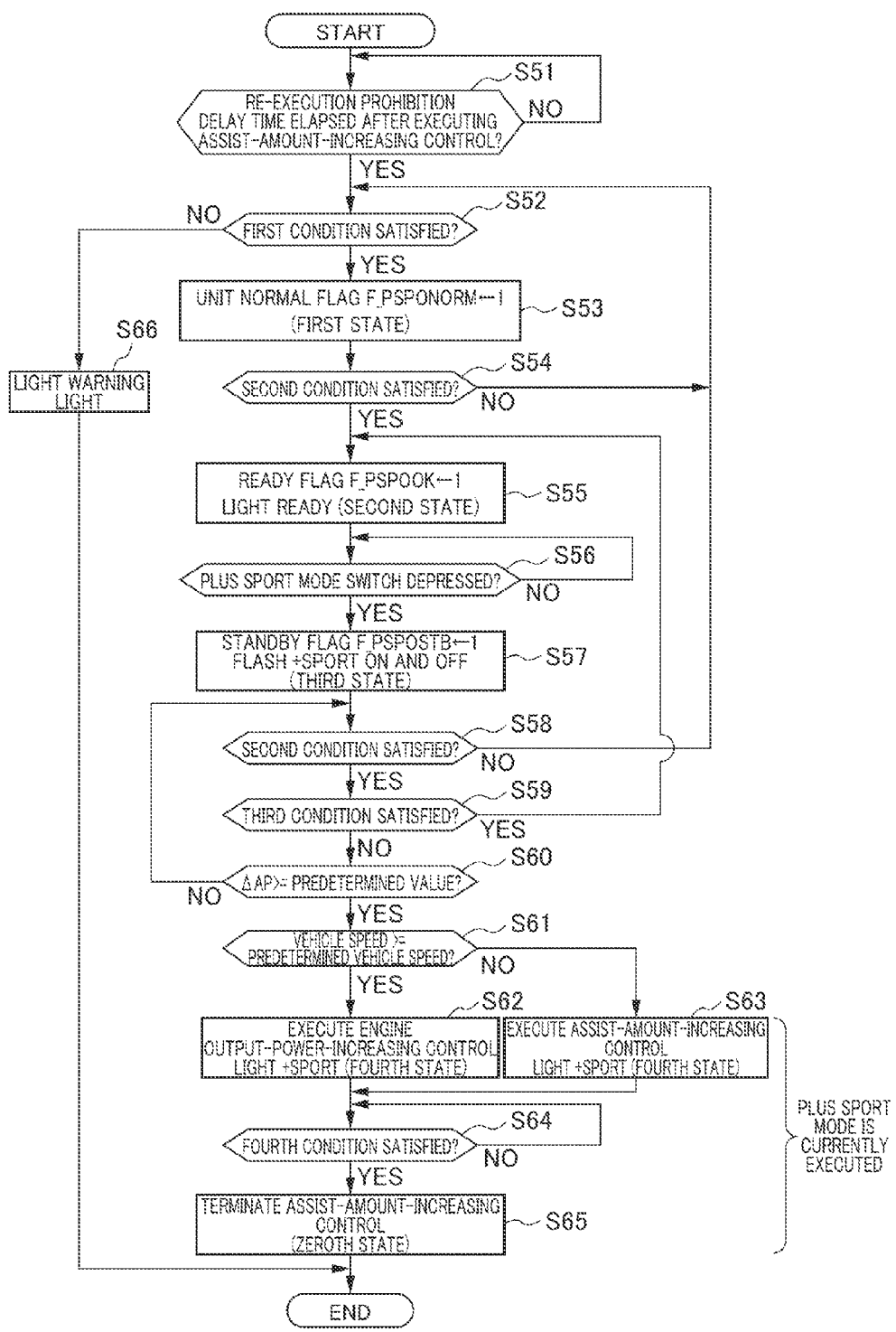
FIG. 10 is a flowchart of output-power-increasing control processing according to a second embodiment.

FIG. 10 is a flowchart of the output-power-increasing control processing according to the second embodiment. This processing is repeatedly executed by the ECU 20B. Control to be executed through Steps S51 to S60 is similar to the control executed through Steps S11 to S20 shown in the flowchart of the output-power-increasing control processing according to the first embodiment.

In Step S61, a determination is made on whether the vehicle speed of the hybrid vehicle 1B is higher than a predetermined vehicle speed. If the determination is YES, the processing advances to Step S62; and if the determination is NO, the processing advances to Step S63.

In Step S62, it is determined that the vehicle speed is high, and engine output-power-increasing control processing for increasing the output power of the engine 11 starts to be executed; and the processing advances to Step S64. While executing, an indicator on a meter or the like indicates that the Plus Sport mode is currently executed (for example, the +SPORT indicator is lit). The state at this time is a fourth state.

In Step S63, since the vehicle speed was determined to be low, the assist-amount-increasing control processing for increasing the assist amount of the motor 12 starts to be executed, and the processing advances to Step S64. While executing, an indicator on a meter or the like indicates that the Plus Sport mode is currently executed (for example, the +SPORT indicator is lit). The state at this time is a fourth state.

Control to be executed through Steps S64 to S66 is similar to the control executed through Steps S22 to S24 shown in the flowchart of the output-power-increasing control processing according to the first embodiment.

Next, the engine output-power-increasing control processing according to the second embodiment is described. The assist-amount-increasing control processing according to the second embodiment is similar to the assist-amount-increasing control processing according to the first embodiment, and is executed when it is selected by the selection unit in accordance with the vehicle speed.

Figure 11:
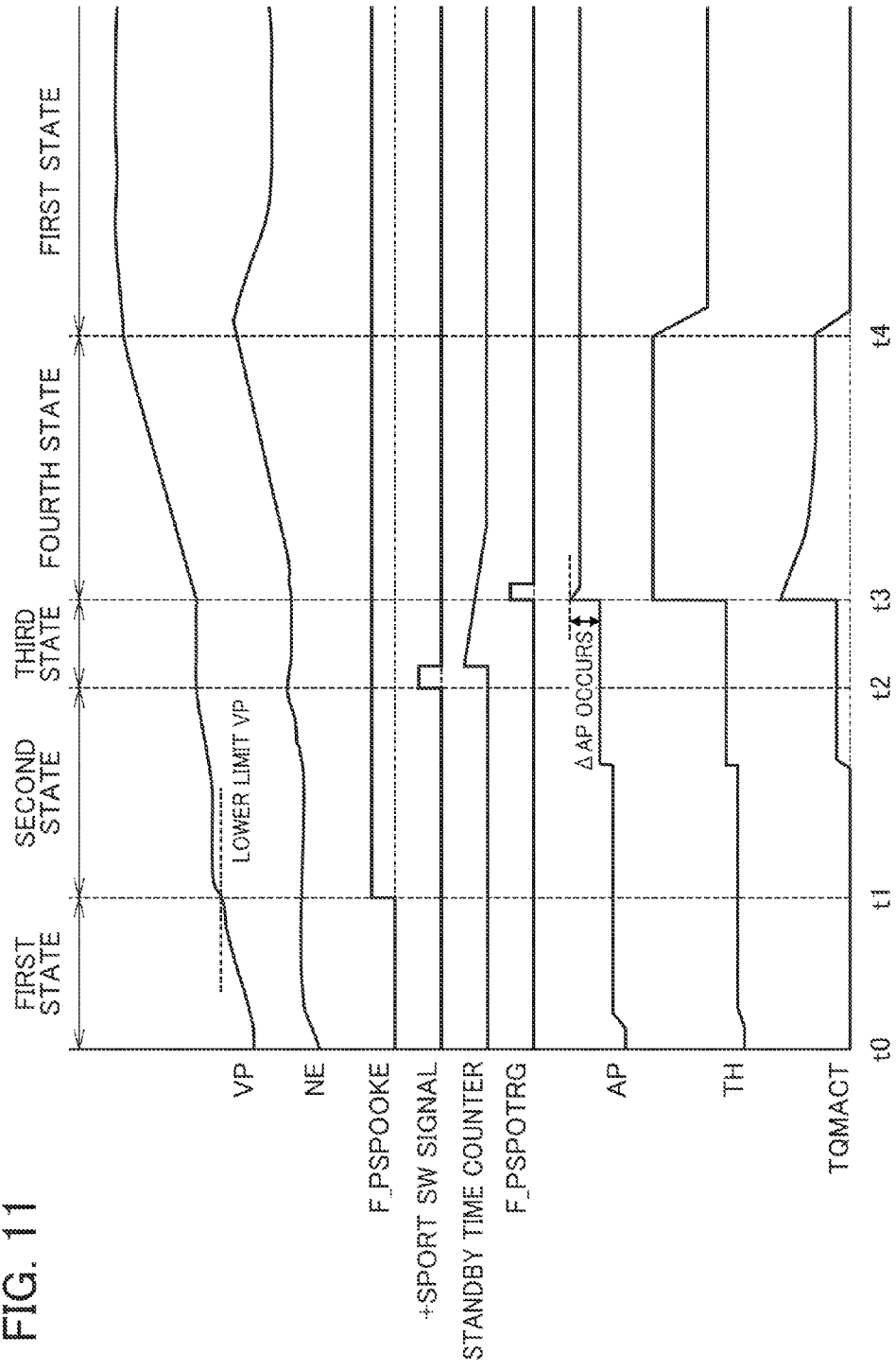
FIG. 11 is a timing diagram showing an example of engine output-power-increasing control processing according to the second embodiment (an example of terminating the Plus Sport mode, based on elapsed time counter)

FIG. 11 is a timing diagram showing an example of engine output-power-increasing control processing according to the second embodiment (an example of terminating the Plus Sport mode, based on elapsed time counter). The present timing diagram shows chronological change in: the vehicle speed VP, the number of revolutions NE of the engine 11, the Plus Sport mode ready flag F_PSPOOK, a Plus Sport mode switch (+SPORT_SW) signal, a Plus Sport mode standby time counter, the Plus Sport mode start flag F_PSPOTRG, the accelerator position AP, a throttle valve aperture TH of the engine 11, and output torque TQMACT of the hybrid vehicle 1B.

As shown in FIG. 11, at first, during a period of time from t0 to t1, since the vehicle speed VP is less than a predetermined lower limit vehicle speed VP, it is determined that the second condition (condition for permitting the Plus Sport mode to be executed) is not satisfied, and execution of the Plus Sport mode is prohibited. It is assumed herein that the first condition (such as not currently performing a fail-safe operation) is satisfied, and that the time t0 to t1 represents the first state.

At time t1, when the vehicle speed VP reaches a predetermined lower limit vehicle speed VP, it is determined that the second condition (condition for permitting the Plus Sport mode to be executed) is satisfied (i.e. the second conditions other than the vehicle speed are also satisfied), and the Plus Sport mode ready flag F_PSPOOK is set to "1". As a result, the current state is determined to be the second state (state ready to execute the Plus Sport mode), and the READY indicator on a meter or the like is turned on (for example, the READY indicator is lit).

At time T2, the user depresses the Plus Sport mode switch 30 to turn on a Plus Sport mode switch signal. As a result, it is determined that the current state is the third state (Plus Sport mode standby state, i.e. a trigger standby state); and the standby indicator on a meter or the like is turned on (for example, the +SPORT indicator flashes on and off).

Upon determining that the current state is the third state, a countdown is started by the Plus Sport mode standby time counter, which is set in advance to a predetermined standby time.

At time t3, the user presses the accelerator pedal, a variation ΔAP occurs in the accelerator position AP, and exceeds a predetermined value; and as a result, the Plus Sport mode start flag F_PSPOTRG is set to "1".

When the Plus Sport mode start flag F_PSPOTRG is set to "1", the Plus Sport mode is executed to increase the output power of the engine 11, by increasing the throttle valve aperture TH to increase the intake air mass. At this time, an indicator on a meter or the like indicates that the Plus Sport mode is currently executed (for example, the ±SPORT indicator is lit). As a result, the output torque TQMACT of the hybrid vehicle 1B is increased.

At time t4, when the second condition (the battery condition, the engine/motor condition, the CVT condition, and the VSA condition) is not satisfied, and the third condition (however, excluding a condition that a predetermined standby time has not elapsed, and a condition of not currently transitioning among the three modes) is satisfied, it is determined that the fourth condition (condition for terminating the execution of the Plus Sport mode) is satisfied, and the execution of the Plus Sport mode for increasing the output power of the engine 11 is suspended. As a result, the output torque TQMACT of the hybrid vehicle is gradually decreased. On and after the time t4, the first condition is satisfied, and the state is determined to be the first state. In the engine output-power-increasing control processing, unlike the assist-amount-increasing control processing, it is not necessary to consider the consumption and remaining SOC level of the battery 14; therefore, it is not necessary to limit the operation time of the Plus Sport mode as the fourth condition (the count value of the operation time counter becomes "0"). However, in the engine output-power-increasing control processing, the operating time of the Plus Sport mode may be limited similarly to the assist-amount-increasing control processing.

Figure 12:
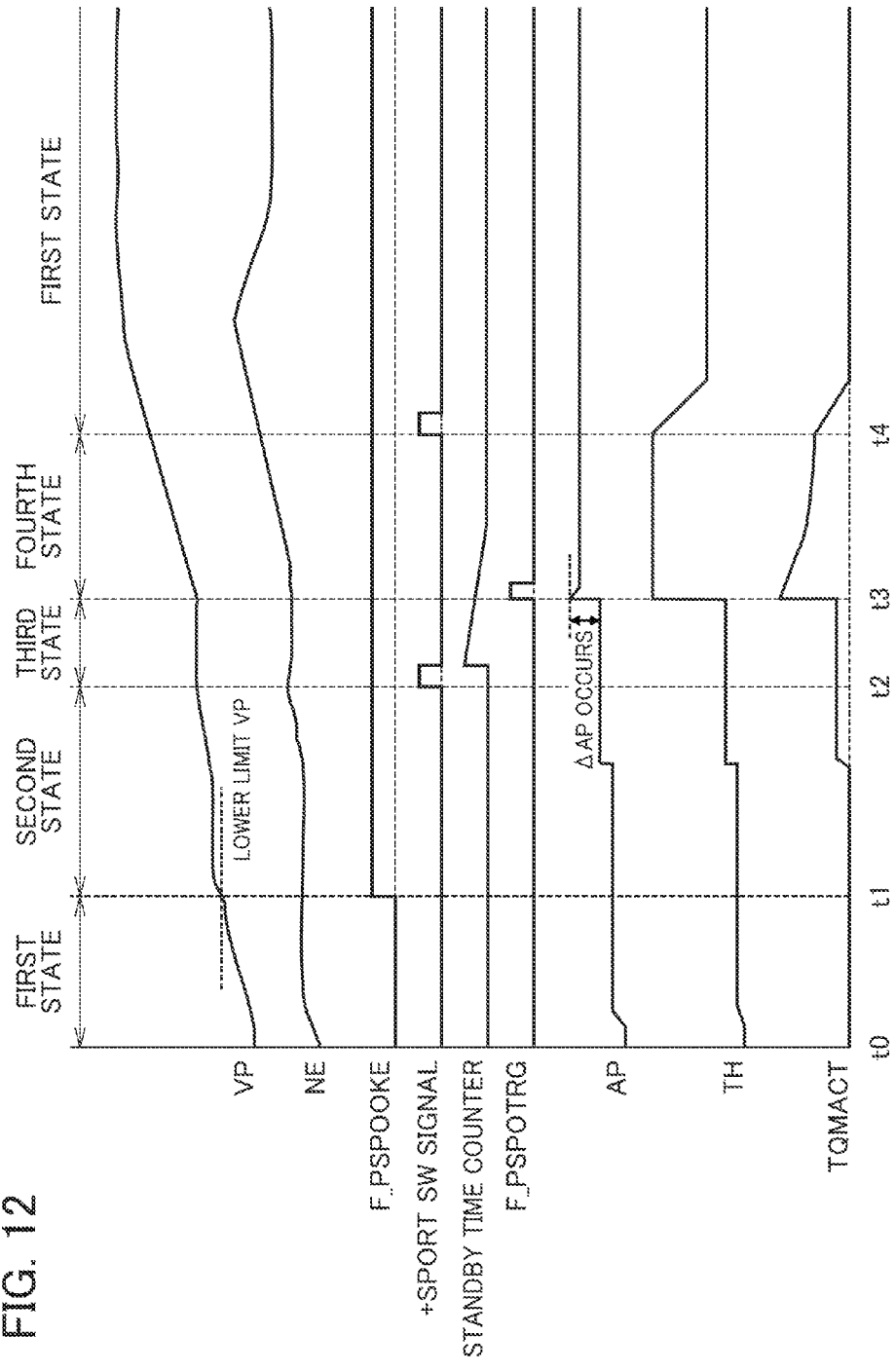
FIG. 12 is a timing diagram showing an example of the engine output-power-increasing control processing according to the second embodiment (an example of terminating the Plus Sport mode by turning on the Plus Sport mode switch again)

FIG. 12 is a timing diagram showing an example of the engine output-power-increasing control processing according to the second embodiment (an example of terminating the Plus Sport mode by turning on the Plus Sport mode switch again). Control to be executed through time t0 to t3 shown in the timing diagram of FIG. 12 is similar to the control shown in the timing diagram of FIG. 11.

In the timing diagram shown in FIG. 12, at time t4, the user depresses the Plus Sport mode switch 30 again to turn on the Plus Sport mode switch signal again, and upon determining that the fourth condition (condition for terminating the execution of the Plus Sport mode) is satisfied, the execution of the Plus Sport mode for increasing the output power of the engine 11 is suspended. As a result, the output torque TQMACT of the hybrid vehicle 1 is gradually decreased. On and after the time t4, the first condition is satisfied, and the state is determined to be the first state.

Figure 13:
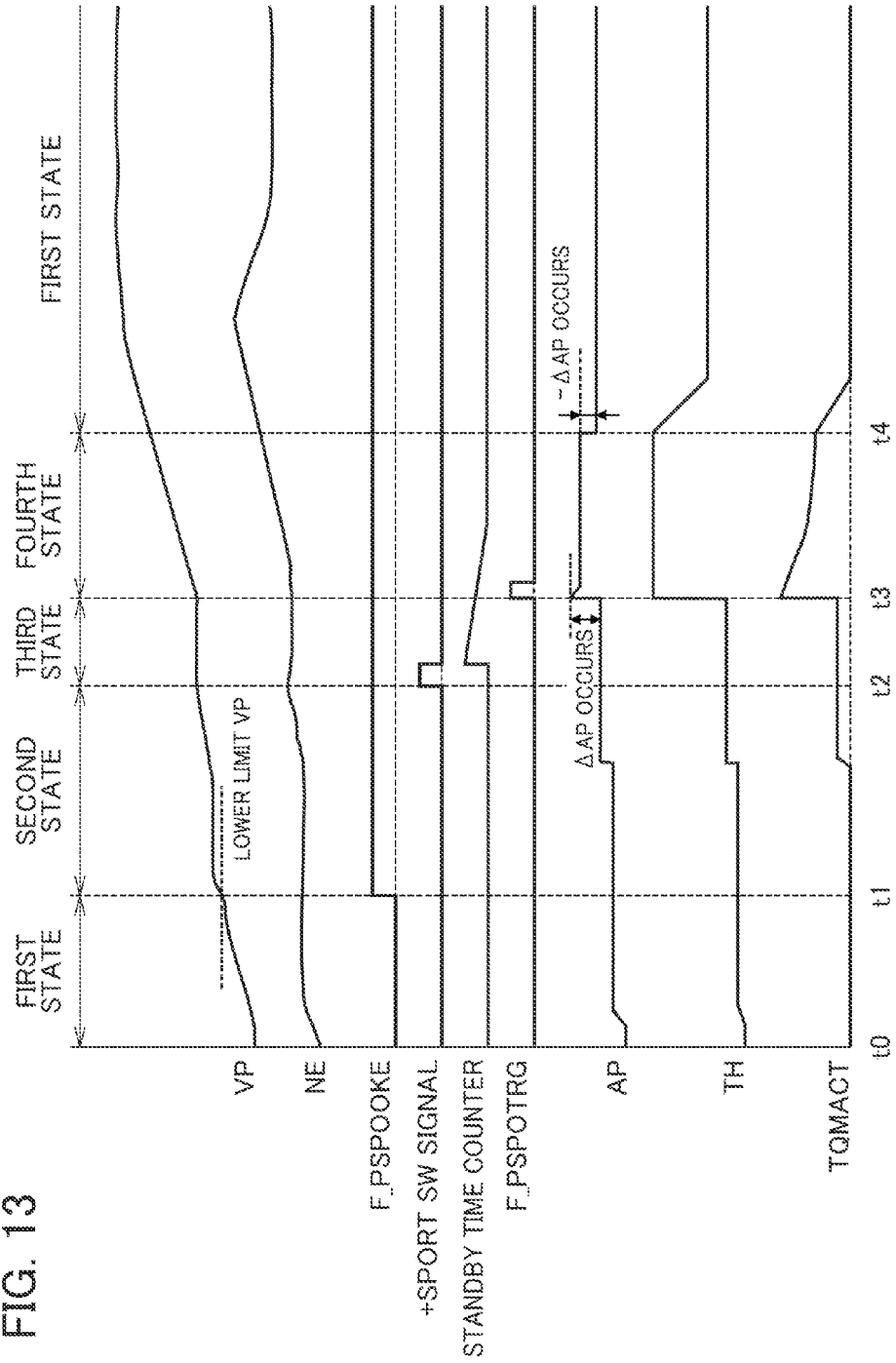
FIG. 13 is a timing diagram showing an example of the engine output-power-increasing control processing according to the second embodiment (an example of terminating the Plus Sport mode, based on occurrence of $-\Delta AP$).

FIG. 13 is a timing diagram showing an example of engine output-power-increasing control processing according to the second embodiment (an example of terminating the Plus Sport mode, based on occurrence of −ΔAP). Control to be executed through time t0 to t3 shown in the timing diagram of FIG. 13 is similar to the control shown in the timing diagram of FIG. 11.

In the timing diagram shown in FIG. 13, at time t4, the user releases the accelerator pedal to cause −ΔAP, and upon determining that the fourth condition (condition for terminating the execution of the Plus Sport mode) is satisfied, the execution of the Plus Sport mode for increasing the output power of the engine 11 is suspended. As a result, the output torque TQMACT of the hybrid vehicle 1 is gradually decreased. On and after the time t4, the first condition is satisfied, and the state is determined to be the first state.

According to the present embodiment, the following effects are achieved, in addition to the effects of the first embodiment.

In addition to the first changing unit, the present embodiment is provided with the second changing unit, which prepares to increase the output power of the engine 11 in response to the first input from the user (depression of the Plus Sport mode switch 30), and subsequently increases the output power of the engine 11 in response to the second input from the user (ΔAP occurring by pressing the accelerator pedal). In the present embodiment, the assist amount of the motor 12 which is increased by the first changing unit, and the output power of the engine 11 which is increased by the second changing unit, are appropriately selected on the basis of the vehicle speed of the hybrid vehicle 1B. According to the present embodiment, the first changing unit for increasing the assist amount of the motor 12, and the second changing unit for increasing the output power of the engine 11 are provided; and as a result, even if the remaining SOC (state of charge) level of the battery 14 provided to the hybrid vehicle 1B is low, the output power of the hybrid vehicle 1B can be increased by increasing the output power of the engine 11.

In the present embodiment, when the vehicle speed of the hybrid vehicle 1B is at least a predetermined vehicle speed, i.e. a high speed, the output power of the engine 11 is increased; and when the vehicle speed of the hybrid vehicle 1B is below the predetermined vehicle speed, i.e. a low speed, the assist amount of the motor 12 is increased. For example, if the assist amount of the motor 12 is increased when the speed is high, the electric power consumption would be increased to accelerate deterioration of the battery 14; however, according to the present embodiment, the output power of the hybrid vehicle 1B is increased by increasing the output power of the engine 11 when the speed is high, thereby making it possible to suppress the deterioration of the battery 14.

In the present embodiment, the output power of the engine 11 is increased by increasing the amount of fuel supply and the intake air mass of the engine 11. This eventually facilitates entry into a kick-down state, making it possible to increase the output power of the engine 11, without separately providing a transmission map of different transmission conditions. Therefore, according to the present embodiment, the memory of the control device can be reduced in size, and the cost can be reduced.

The present invention is not limited to the second embodiment, and the present invention includes alterations, improvements, etc. within the range that can achieve the object of the present invention. For example, similarly to the first embodiment, the second embodiment may also be provided with a first motor 12a as a front motor, and a second motor 12b as a rear motor.

In the second embodiment, the ECU 20B is provided with the selection unit for selecting whether the assist amount of the motor 12 is increased, or the output power of the engine 11 is increased, based on the vehicle speed of the hybrid vehicle 1B; however, it is not limited to thereto. For example, the configuration of the selection unit may be modified so as to provide an ECU 20C, which selects whether the assist amount of the motor 12 is increased, or the output power of the engine 11 is increased, based on the number of revolutions of the engine 11, or the number of revolutions of the motor 12. As a result, similarly to the second embodiment, even if the remaining SOC level of the battery 14 is low, the output power of the hybrid vehicle 1C can be increased by increasing the output power of the engine 11. Further, for example, when the output power is constant, the torque becomes greater as the number of revolutions becomes smaller; however, according to the present modification example, change in the assist amount of the motor 12 and change in the output power of the engine 11 are selected based on the number of revolutions; therefore, the output power can be changed based on more accurate torque.

For example, if the assist amount of the motor 12 is increased when the number of revolutions of the engine 11 or the number of revolutions of the motor 12 at least a predetermined number of revolutions, the electric power consumption would be increased to accelerate the deterioration of the battery 14; however, according to the present modification example, when the number of revolutions of the engine 11 or the number of revolutions of the motor 12 is at least a predetermined number of revolutions, the output power of the hybrid vehicle 1C is increased by increasing the output power of the engine 11; therefore, the deterioration of the battery 14 can be suppressed.

The invention claimed is:

1. A control device for a hybrid vehicle including an internal combustion engine and an electric motor for assisting the internal combustion engine with power, the control device comprising:
   a first changing unit, which prepares to change an assist amount of the electric motor in response to a first input from a user, and subsequently changes the assist amount of the electric motor in response to a second input from the user;
   a second changing unit, which prepares to change output power of the internal combustion engine in response to the first input from the user, and subsequently changes the output power of the internal combustion engine in response to the second input from the user; and
   a first selecting unit, which selects the first changing unit or the second changing unit, based on a number of revolutions of the internal combustion engine or a number of revolutions of the electric motor,
   wherein the first changing unit cancels the second input when a predetermined time has elapsed after receiving the first input.

2. The control device for the hybrid vehicle according to claim 1,
   wherein the first selecting unit selects the second changing unit when the number of revolutions of the internal combustion engine or the number of revolutions of the electric motor is at least a predetermined number of revolutions; and
   wherein the first selecting unit selects the first changing unit when the number of revolutions of the internal combustion engine or the number of revolutions of the electric motor is below the predetermined number of revolutions.

3. The control device for the hybrid vehicle according to claim 1, further comprising a second selecting unit, which selects the first changing unit or the second changing unit, based on a vehicle speed of the hybrid vehicle.

4. The control device for the hybrid vehicle according to claim 3,
   wherein the second selecting unit selects the second changing unit when the vehicle speed is at least a predetermined vehicle speed, and wherein the second selecting unit selects the first changing unit when the vehicle speed is below the predetermined vehicle speed.

5. The control device for the hybrid vehicle according to claim 1, further comprising:
   a turning determination unit, which determines that the hybrid vehicle is not turning when a steering angle of the hybrid vehicle is within a range of predetermined steering-angle threshold values, and which determines that the hybrid vehicle is turning when the steering angle is outside the range of the steering-angle threshold values; and
   a first permitting unit, which permits change by the first changing unit and change by the second changing unit if it is determined that the hybrid vehicle is not turning, and which prohibits change by the first changing unit and change by the second changing unit if it is determined that the hybrid vehicle is turning.

6. The control device for the hybrid vehicle according to claim 1, further comprising:
   a driving-wheel skidding determination unit, which determines that driving wheels are skidding if a difference in front and rear wheel speeds of the hybrid vehicle is at least a predetermined threshold value of difference in front and rear wheel speeds, and which determines that the driving wheels are not skidding if the difference in front and rear wheel speeds of the hybrid vehicle is below the predetermined threshold value of difference in front and rear wheel speeds;
   a second permitting unit, which permits change by the first changing unit and change by the second changing unit if it is determined that the driving wheels are not skidding, and which prohibits change by the first changing unit and change by the second changing unit if it is determined that the driving wheels are skidding;
   a spinning determination unit, which determines that the driving wheels are spinning if a difference in right and left wheel speeds of the hybrid vehicle is at least a predetermined threshold value of difference in right and left wheel speeds, and which determines that the driving wheels are not spinning if the difference in right and left wheel speeds of the hybrid vehicle is below the predetermined threshold value of difference in right and left wheel speeds; and
   a third permitting unit, which permits change by the first changing unit and change by the second changing unit if it is determined that the driving wheels are not spinning, and which prohibits change by the first changing unit and change by the second changing unit if it is determined that the driving wheels are spinning.

* * * * *